US010764365B2

(12) United States Patent
Kojo et al.

(10) Patent No.: US 10,764,365 B2
(45) Date of Patent: Sep. 1, 2020

(54) WEB APPLICATION SYSTEM, SERVER, TERMINAL, AND STORAGE MEDIUM

(71) Applicant: KABUSHIKI KAISHA TOSHIBA, Minato-ku (JP)

(72) Inventors: Masashi Kojo, Kanagawa (JP); Nobuyasu Nakajima, Kanagawa (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 108 days.

(21) Appl. No.: 16/122,581

(22) Filed: Sep. 5, 2018

(65) Prior Publication Data

US 2019/0007492 A1 Jan. 3, 2019

Related U.S. Application Data

(63) Continuation of application No. PCT/JP2017/023016, filed on Jun. 22, 2017.

(51) Int. Cl.
*G06F 15/16* (2006.01)
*H04L 29/08* (2006.01)
(Continued)

(52) U.S. Cl.
CPC ........ *H04L 67/1095* (2013.01); *G06F 16/957* (2019.01); *H04L 67/02* (2013.01);
(Continued)

(58) Field of Classification Search
CPC ..... H04L 67/1095; H04L 67/02; H04L 67/04; H04L 67/12; H04L 67/32; H04L 67/42; G06F 16/957
See application file for complete search history.

(56) References Cited

U.S. PATENT DOCUMENTS 5,768,510 A 6/1998 Gish
5,987,245 A 11/1999 Gish
(Continued)

FOREIGN PATENT DOCUMENTS

EP 1845688 A1 10/2007
JP B-3418500 6/2003
(Continued)

OTHER PUBLICATIONS

International Search Report and Written Opinion dated Aug. 22, 2017, issued in PCT Application No. PCT/JP2017/023016.

*Primary Examiner* — Sm A Rahman
(74) *Attorney, Agent, or Firm* — Oblon, McClelland, Maier & Neustadt, L.L.P.

(57) ABSTRACT

A web application system of an embodiment includes a server and a terminal. The server includes a server-side updating device, a server-side detection device, and a server-side synchronization device. The terminal includes an application execution device. The server-side updating device updates first information stored in a server-side storage device on the basis of a server-side event. The server-side detection device detects that the first information has been updated. The server-side synchronization device notifies the terminal of information indicating that the first information has been updated when it is detected that the first information has been updated. The application execution device functions by a web application being executed. Further, the application execution device starts synchronization of second information stored in a terminal-side storage device with the first information when information indicating that the first information has been updated is received from the server. Further, the application execution device executes a process based on the second information according to an operation of a user.

17 Claims, 18 Drawing Sheets

(51) Int. Cl.
*G06F 16/957* (2019.01)
*H04L 29/06* (2006.01)

(52) U.S. Cl.
CPC .............. *H04L 67/04* (2013.01); *H04L 67/12* (2013.01); *H04L 67/32* (2013.01); *H04L 67/42* (2013.01)

(56) References Cited

U.S. PATENT DOCUMENTS

| | | | |
|---|---|---|---|
| 6,892,210 B1 * | 5/2005 | Erickson | G06F 16/27 |
| 2004/0029638 A1 * | 2/2004 | Hytcheson | H04L 67/1095 463/42 |
| 2013/0007518 A1 * | 1/2013 | George | H04L 67/06 714/16 |

FOREIGN PATENT DOCUMENTS

| | | |
|---|---|---|
| JP | A-2004-127030 | 4/2004 |
| JP | A-2004-515833 | 5/2004 |
| JP | A-2009-514074 | 4/2009 |

* cited by examiner

| VARIABLE | STATE | REVISION NUMBER | ACKNOWLEDGED REVISION NUMBER | UPDATE FLAG | ... |
|---|---|---|---|---|---|
| summary1 | EMPTY LIST | 0 | 0 | False | ... |
| summary2 | EMPTY LIST | 0 | 0 | False | ... |
| ... | ... | ... | ... | ... | ... |

| VARIABLE | STATE | REVISION NUMBER | ACKNOWLEDGED REVISION NUMBER | UPDATE FLAG | ... |
|---|---|---|---|---|---|
| summary1 | {40, 40, 40, 60, 150, 133, 115} | 0 | 0 | True | ... |
| ... | ... | ... | ... | ... | ... |

| VARIABLE | STATE | REVISION NUMBER | ACKNOWLEDGED REVISION NUMBER | UPDATE FLAG | ... |
|---|---|---|---|---|---|
| summary1 | {40, 40, 40, 60, 150, 133, 115} | 1 | 0 | False | ... |
| ... | ... | ... | ... | ... | ... |

254

| VARIABLE | STATE | REVISION NUMBER | ACKNOWLEDGED REVISION NUMBER | UPDATE FLAG | ... |
|---|---|---|---|---|---|
| summary1 | {40, 40, 40, 60, 150, 133, 115} | 1 | 1 | False | ... |
| ... | ... | ... | ... | ... | ... |

FIG. 20

```
@Controller(urls="/power")        ⎫
class Power {                     ⎪
    @ReadOnly                     ⎬ 182A
    SList<Integer>summary;        ⎪
}                                 ⎭

@Controller(urls="/power",        ⎫
    roles="ADMIN")                ⎪
class PowerAdmin{                 ⎬ 182B
    SList<Integer>summary;        ⎪
}                                 ⎭
```

| TARGET CLASS | AUTHENTICATION | PERMISSION | TYPE OF VARIABLE | VARIABLE NAME | WRITING AVAILABILITY | ... |
|---|---|---|---|---|---|---|
| Power | NOT REQUIRED | NOT REQUIRED | SList<Integer> | summary | NO | ... |
| PowerAdmin | REQUIRED | ADMIN | SList<Integer> | summary | YES | ... |
| ... | ... | ... | ... | ... | ... | ... |

WEB APPLICATION SYSTEM, SERVER, TERMINAL, AND STORAGE MEDIUM

CROSS REFERENCE TO RELATED APPLICATION

This application is a continuation patent application of International Application No. PCT/JP2017/023016, filed Jun. 22, 2017; the entire contents of which are incorporated herein by reference.

FIELD

Embodiments described herein relate to a web application system, a server, a terminal, and a storage medium.

BACKGROUND

In the related art, a web application that operates through cooperation between a program operating on a browser of a terminal and a program on a server side is known. When the web application is used, a user operates an item or the like displayed on a browser screen to make a request from the terminal to the server, such that the server can be caused to execute a predetermined process or information managed by the server can be acquired and displayed on the browser screen. Therefore, in a case in which communication between the terminal and the server is disconnected, the information cannot be acquired from the server and it may be difficult for the use of the web application to continue.

BRIEF DESCRIPTION OF THE DRAWINGS

FIG. 5 is a diagram illustrating an example of content of first information 174.

FIG. 6 is a diagram illustrating an example of the content of first information 174 updated by a search device 160.

FIG. 7 is a diagram illustrating an example of the content of first information 174 updated by a server-side detection device 130.

FIG. 20 is a diagram illustrating an example of the content of information definition generation source data 182.

FIG. 21 is a diagram illustrating an example of the content of information definition data 176.

DETAILED DESCRIPTION

An object of the present invention is to provide a web application system, a server, a terminal, and a storage medium capable of improving continuity of use.

A web application system of an embodiment includes a server and a terminal. The server includes a server-side updating device, a server-side detection device, and a server-side synchronization device. The terminal includes an application execution device. The server-side updating device updates first information stored in a server-side storage device on the basis of a server-side event. The server-side detection device detects that the first information has been updated. The server-side synchronization device notifies the terminal of information indicating that the first information has been updated when the server-side detection device detects that the first information has been updated. The application execution device functions by a web application being executed. Further, the application execution device includes a terminal-side synchronization device and a process execution device. The terminal-side synchronization device starts synchronization of second information stored in a terminal-side storage device with the first information when information indicating that the first information has been updated is received from the server. The process execution device executes a process based on the second information according to an operation of a user.

Hereinafter, a web application system, a server, a terminal, and a storage medium of embodiments will be described with reference to the drawings.

First Embodiment

Figure 1:
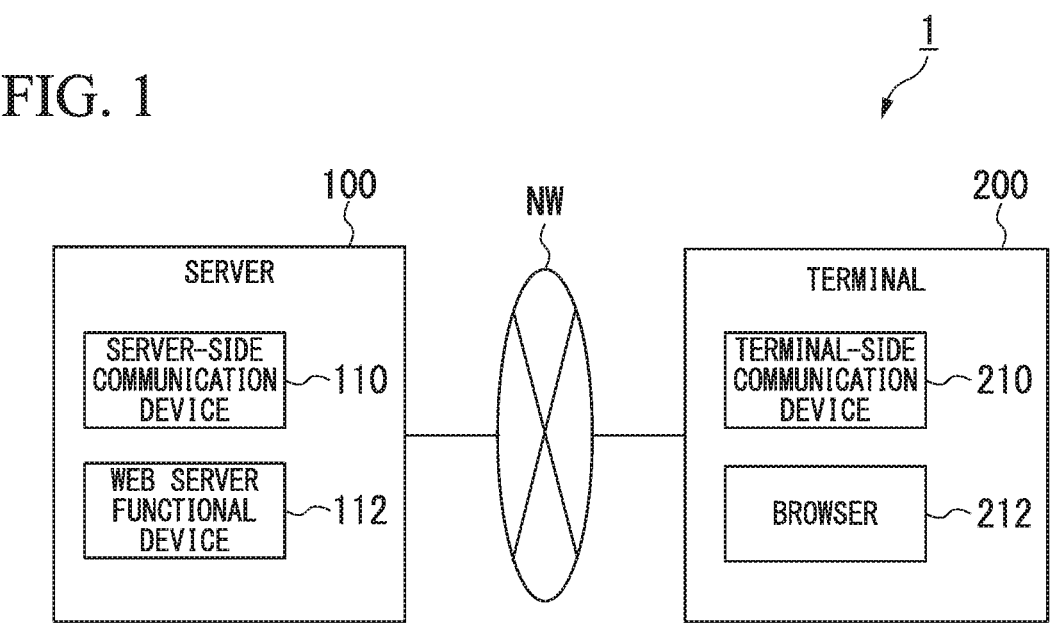
FIG. 1 is a diagram illustrating a state before system activation of a web application system 1 of a first embodiment.

FIG. 1 is a diagram illustrating a state before system activation of a web application system 1 according to a first embodiment. The web application system 1 includes, for example, one or more servers 100 and one or more terminals 200. The server 100 and the terminal 200 communicate via a network NW including the Internet, a local area network (LAN), a wide area network (WAN), or the like.

The server 100 is, for example, a web server that provides a predetermined website. The server 100 includes, for example, a server-side communication device 110 and a web server functional device 112. The web server functional device 112 is an example of a "program providing device."

The server-side communication device 110 communicates with a terminal-side communication device 210 via the network NW. The server-side communication device 110 is, for example, a communication interface such as a network interface card (NIC) or a wireless communication module.

When the server-side communication device 110 receives a request from a browser 212 of the terminal 200, the web server functional device 112 transmits (provides) a web page in which a program (for example, a program described in JavaScript (registered trademark)) for realizing a web application function is embedded, to the terminal 200.

The terminal 200 includes, for example, the terminal-side communication device 210 and the browser 212. The terminal-side communication device 210 communicates with the server 100 via the network NW. The terminal-side communication device 210 is, for example, a communication interface such as an NIC or a wireless communication module.

The browser 212 accesses a predetermined website of the server 100 and executes a program that is downloaded from the server 100. Accordingly, the terminal 200 can realize each function of the web application system 1 using the browser 212.

Figure 2:
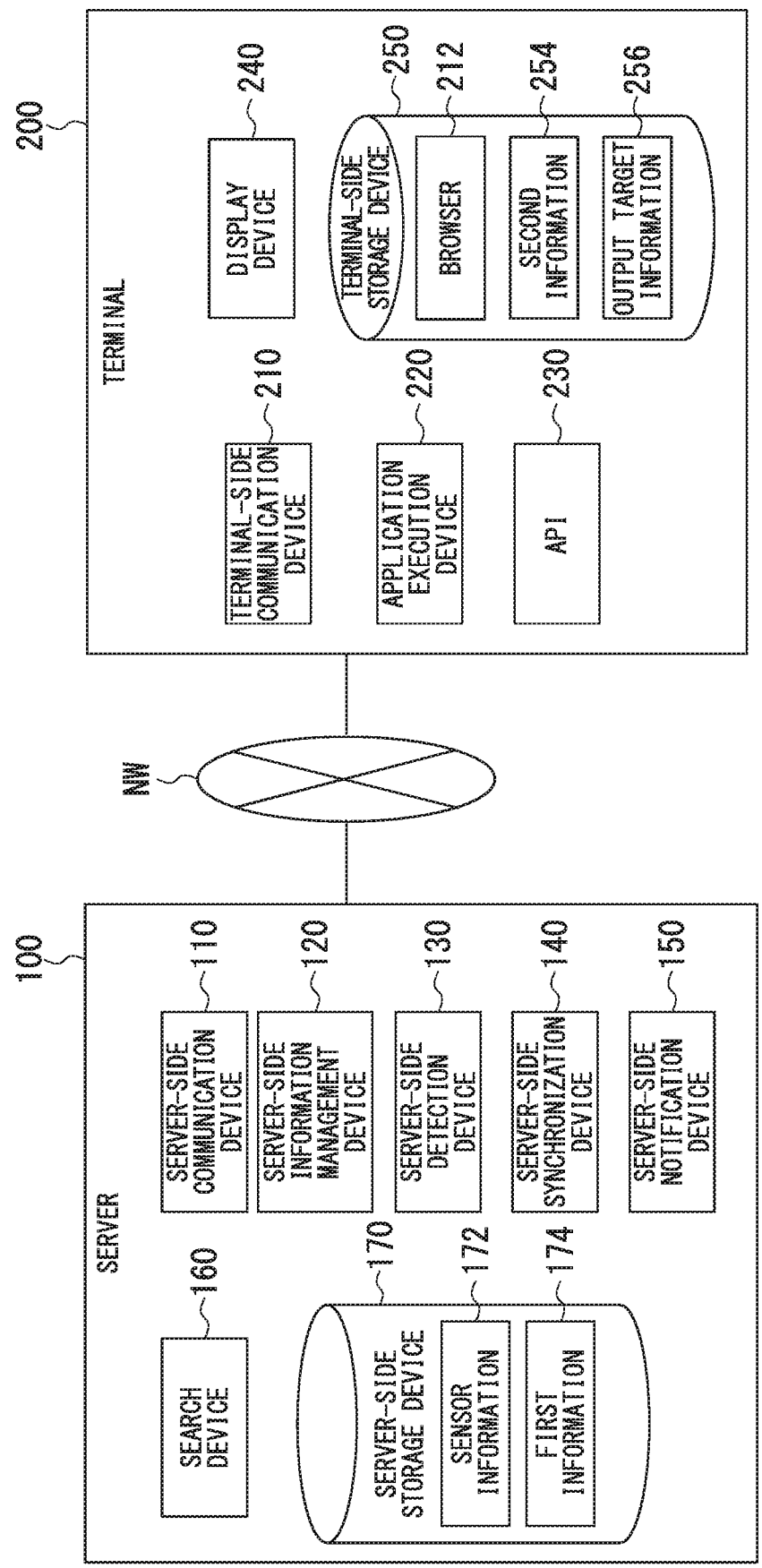
FIG. 2 is a diagram illustrating a functional configuration example of the web application system 1 according to the first embodiment.

FIG. 2 is a diagram illustrating a functional configuration example of the web application system 1 according to the first embodiment. In the following description, the same names and reference numerals are used for components that are the same as those described with reference to FIG. 1, and detailed description thereof will be omitted.

First, a functional configuration example of the server 100 will be described. The server 100 includes, for example, a server-side communication device 110, a server-side information management device 120, a server-side detection device 130, a server-side synchronization device 140, a server-side notification device 150, a search device 160, and a server-side storage device 170. The server-side information management device 120, the server-side detection device 130, the server-side synchronization device 140, the server-side notification device 150, and the search device 160 are realized by a hardware processor such as a central processing unit (CPU) executing a program (software components) stored in the server-side storage device 170. The program, for example, may be downloaded from an application server (not illustrated) via the network NW or a program stored in a portable storage medium such as an SD card may be to installed in the server 100. Further, the search device 160 is an example of a "server-side updating device."

The server-side information management device 120 manages the first information 174 stored in the server-side storage device 170. The first information 174 is information that is synchronized with the second information 254 managed by the terminal 200. Details of the first information 174 will be described below. The server-side information management device 120 performs, for example, creation, reading, or deletion of the first information 174 according to a server-side event. The server-side event is, for example, an event that occurs irrespective of a request from the terminal 200, and includes various processes such as acquisition or output of data, and calculation. Further, the server-side information management device 120 transmits structure information of the first information 174 to the terminal 200 in response to a request for acquisition of structure information from the terminal-side information management device 221. The structure information includes, for example, identification information (ID) for identifying information such as a type and a variable indicating a data structure of the first information 174, and a value corresponding to the ID.

The server-side detection device 130 detects that the content of the first information 174 has been updated. Updating of the content of the first information 174 is, for example, a case in which new information is added to the first information 174 or the already stored information is changed or deleted by the server 100 executing a predetermined process according to a server-side event. Further, updating the content of the first information 174 may include, for example, a case in which a request for acquisition of sensor information or the like from the terminal 200 is written in the first information 174.

When the server-side detection device 130 detects that the content of the first information 174 has been updated, the server-side synchronization device 140 performs a process of synchronizing the first information 174 with the second information of the terminal 200. Details of the function of the server-side synchronization device 140 will be described below.

When an acquisition request from the terminal 200 is written to the first information 174, the server-side notification device 150 notifies the search device 160 of information indicating that the acquisition request has been written.

The search device 160 acquires a request for acquisition of sensor information from the first information 174 on the basis of the information notified by the server-side notification device 150 and extracts the sensor information corresponding to the request from sensor information 172 stored in the server-side storage device 170 on the basis of the acquired request for acquisition of sensor information. The sensor information 172 is, for example, a detected value that is acquired periodically or at a predetermined timing from various sensors installed in a monitoring and control target of the server 100 according to the server-side event. Further, the monitoring and control target is, for example, a social infrastructure such as a power value in a substation or a power transmission network, the amount of water in a water and sewerage, traffic on a highway, or an atmospheric pressure value in a weather radar, the amount of use of an air conditioner or a lighting at home, the amount of energy of solar power generation or the like, or a value detected through, for example, a system check of a delivered device or a logic circuit.

Further, the sensor information 172 may not be stored in the server-side storage device 170, but may be stored in a database provided outside the server 100. In this case, the server 100 may access the external database on the basis of the request for acquisition of the sensor information from the terminal 200 and acquire the sensor information that is a target from the stored sensor information 172.

The server-side storage device 170 is realized by a random access memory (RAM), a read only memory (ROM), a hard disk drive (HDD), flash memory, or the like. For example, the sensor information 172, one or more pieces of first information 174, and other information are stored in the server-side storage device 170.

Next, a functional configuration example of the terminal 200 will be described. The terminal 200 includes, for example, the terminal-side communication device 210, the application execution device 220, an application programming interface (API) 230, the display device 240, and a terminal-side storage device 250.

The application execution device 220 is realized by a hardware processor such as a CPU executing a program.

Figure 3:
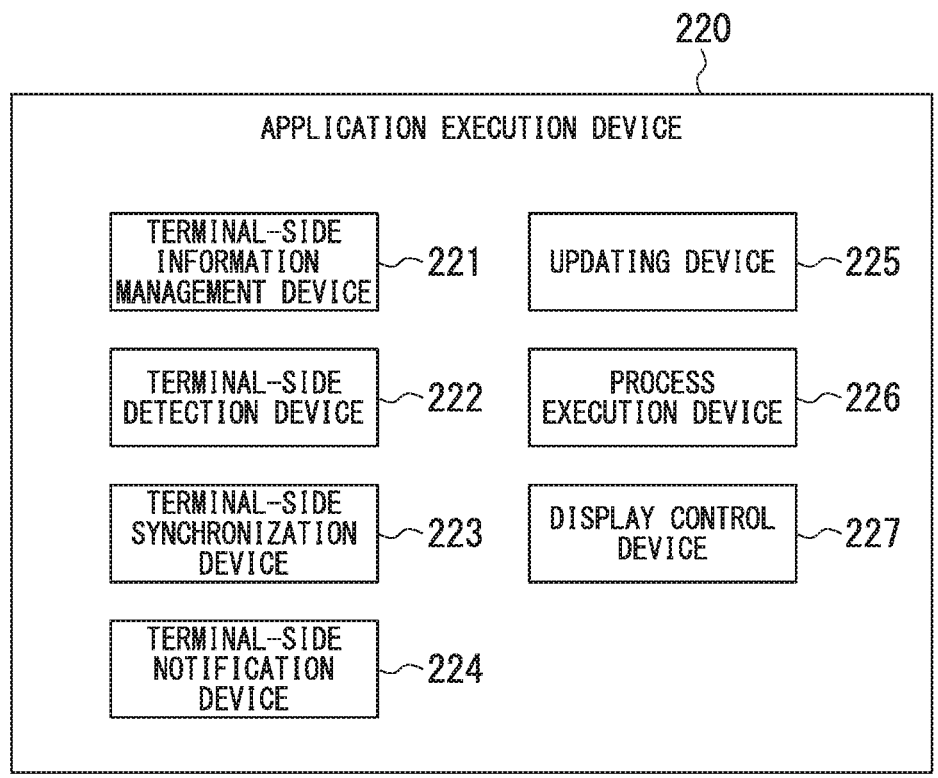
FIG. 3 is a diagram illustrating a functional configuration example of an application execution device 220.

The application execution device 220 is realized by activating the browser 212 stored in the terminal-side storage device 250 so that a program downloaded by accessing a predetermined website is executed. FIG. 3 is a diagram illustrating a functional configuration example of the application execution device 220. The application execution device 220 includes, for example, a terminal-side information management device 221, a terminal-side detection device 222, a terminal-side synchronization device 223, a terminal-side notification device 224, an updating device 225, a process execution device 226, a display control device 227.

The terminal-side information management device 221 manages the second information 254 stored in the terminal-side storage device 250. The second information 254 is information that is synchronized with the first information 174 managed by the server 100. Details of the second information 254 will be described below. The terminal-side information management device 221 requests the server-side information management device 120 to provide the structure information of the first information 174 and generates the second information 254 having the same structure information as the first information 174 on the basis of the structure information acquired according to the request.

The terminal-side detection device 222 detects that content of the second information 254 has been updated. Updating the content of the second information 254 is, for example, a case in which new information is added to the second information 254 or already stored information is updated or deleted by the server 100 executing a predetermined process according to the server-side event and correspondingly the terminal 200 executing a predetermined process. Further, updating the content of the second information 254 may include, for example, a case in which a request for acquisition of the sensor information or the like instructed by the user via the API 230 is written.

The terminal-side synchronization device 223 performs a process of synchronization with the server-side synchronization device 140 and performs a synchronization process of synchronizing the first information 174 with the second information 254. Details of the function of the terminal-side synchronization device 223 will be described below.

When the terminal-side detection device 222 detects that the second information 254 has been updated, the terminal-side notification device 224 notifies the updating device 225 of information indicating that the second information 254 has been updated.

When the updating device 225 receives a notification of information indicating that the second information 254 has been updated, the updating device 225 reads the second information 254 and causes the process execution device 226 to update output target information 256 on the basis of the read information. Further, the output target information 256 is, for example, sensor information to be displayed on a screen of the display device 240.

The process execution device 226 executes a predetermined process on the basis of the second information 254 according to an operation of the user. The predetermined process is, for example, a process of updating the output target information 256 on the basis of the second information 254. Further, the predetermined process is a process of causing a request for acquisition of sensor information or the like instructed from the browser screen by the user to be output to the server 100 via the API 230.

The display control device 227 controls the display device 240 so that the browser screen is displayed. Further, the display control device 227 receives, for example, a request for acquisition of sensor information in a specific facility instructed by the user, extracts sensor information corresponding to the request for acquisition from the output target information 256 on the basis of the received request for acquisition, and causes the display device 240 to display the extracted sensor information.

Referring back to FIG. 1, the API 230 has a function of transmitting the request for acquisition of sensor information made by the process execution device 226 to the server 100. The API 230, for example, writes an ID for identifying sensor information that is an acquisition target to the second information 254.

The display device 240 is, for example, a liquid crystal display (LCD), an organic electro luminescence (EL) display device, or the like. Under the control of the display control device 227, the display device 240 displays information instructed by the user in the output target information 256 stored in the terminal-side storage device 250.

The terminal-side storage device 250 is realized by a RAM, a ROM, an HDD, a flash memory, or the like. For example, the browser 212, one or more pieces of second information 254, the output target information 256, and other information are stored in in the terminal-side storage device 250.

Figure 4:
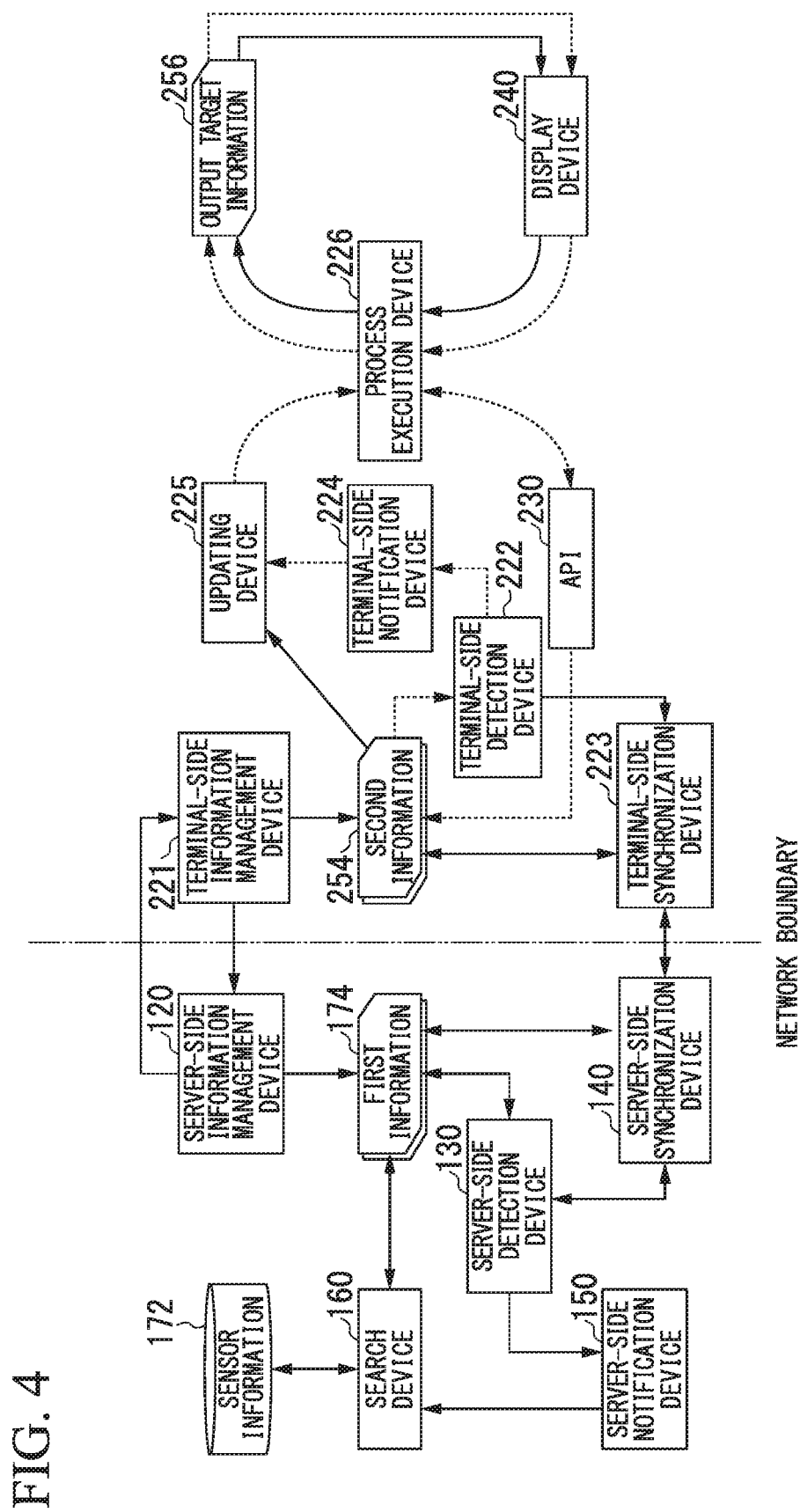
FIG. 4 is a diagram illustrating an architecture of the web application system 1 according to the first embodiment.

Next, the architecture of the web application system 1 will be described with reference to the drawings. FIG. 4 is a diagram illustrating the architecture of the web application system 1 according to the first embodiment. The web application system 1 causes the terminal 200 to manage the second information 254 obtained by copying the first information 174 managed by the server 100 and causes the first information 174 and the second information 254 to be synchronized with each other. Accordingly, when the terminal 200 displays the information on the display device 240, the terminal 200 can acquire information that is a display target without crossing a network boundary between the server 100 and the terminal 200. Thus, it is possible to maintain the continuity of an operation at the time of disconnection of the communication and to improve the stability of the system.

For example, in the first embodiment, first, when the web application is executed due to activation of the browser 212 according to an instruction of the user or the like, the terminal-side information management device 221 of the application execution device 220 requests the server-side information management device 120 to provide the structure information of the first information 174. The server-side information management device 120 transmits the structure information of the first information 174 to the terminal-side information management device 221 on the basis of the request from the terminal-side information management device 221.

FIG. 5 is a diagram illustrating an example of the content of the first information 174. The first information 174 includes "variable", "state", "revision number", "acknowledged revision number", and "update flag". The "variable" is an ID for identifying information. The "state" is a value corresponding to the "variable". The "state" includes information on a type of a value (for example, a floating point, an integer, or an 8-bit bit string) associated with the variable.

The "revision number", the "acknowledged revision number", and the "update flag" are numbers that are used for a process of synchronization with the second information 254 to be described below. The "revision number" is a revision number for managing updating of the variable. For example, when there is a change in the content of the variable, the update flag is first changed from "false" to "true". In this case, the revision number is not updated. Then, the server-side detection device 130 that has detected that the update flag is "true" changes the update flag to "false" and updates the revision number. For example, a value of the revision number increases by one each time updating occurs.

The "acknowledged revision number" is a number that is used for a synchronization determination as to whether or not the first information 174 and the second information 254 are synchronized with each other. For example, the server-side synchronization device 140 determines that synchronization is made (synchronization completion) when the revision number matches the acknowledged revision number and determines that synchronization is not made when the revision number does not match the acknowledged revision number. When the revision number matches the acknowledged revision number, for example, values completely match. Further, "matching" may include partial matching, matching by using a relationship between 123 and ABC, matching by comparing hashed values, or the like.

The "update flag" is a flag for detecting update of the variable. For example, when the server-side detection device 130 detects that the update flag is "true", the server-side detection device 130 changes the update flag to "false", updates the revision number, and notifies the server-side synchronization device 140 and the server-side notification device 150 of this fact.

It should be noted that when the "update flag" is not provided in the first information 174, for example, an item "notified state" may be added in addition to the item of the "state", and the server-side detection device 130 may determine whether or not updating has been performed according to whether or not the content of the "state" matches the content of the "notified state". Further, the server-side detection device 130 may determine whether or not updating has been performed by using a "hash value in a notified state" obtained by hashing the content of the "state" instead of the "notified state". By providing the above-described "update flag", it can be easily determined whether or not updating has been performed, and it is not necessary for high-cost calculation, such as a determination as to whether or not updating has been performed through a comparison with other information using the content of the "state", to be performed.

The terminal-side information management device 221 receives a variable, a state, a type of the state, a revision number, and the like of the first information 174 as the structure information from the server-side information management device 120, and generates the second information 254 having the same structure information as the first information 174 on the basis of the received structure information.

Here, it is assumed that the display control device 227 receives selection of a process flow of displaying sensor information provided in a specific facility by the user on the browser and performing monitoring. The process execution device 226 calls the API 230 that executes a request for monitoring of the selected process flow. The API 230 writes a variable (ID) related to a target process flow to the second information 254 as the request for acquisition of sensor information in the second information 254.

When the terminal-side detection device 222 detects that the content of the second information 254 has been updated, the terminal-side detection device 222 notifies the terminal-side synchronization device 223 of information indicating that the content of the second information 254 has been updated.

When the terminal-side synchronization device 223 receives the notification, the terminal-side synchronization device 223 reads the fact that the "revision number" and the "acknowledged revision number" do not match from the second information 254, and transmits information indicating the fact to the server-side synchronization device 140. The server-side synchronization device 140 writes the information obtained from the terminal-side synchronization device 223 to the first information 174. The server-side detection device 130 detects that the first information 174 has been updated according to the notification from the server-side synchronization device 140. Further, the server-side detection device 130 changes the "update flag" as described above. Further, the server-side detection device 130 outputs information indicating that the first information 174 has been updated to the server-side notification device 150.

The server-side notification device 150 outputs the information indicating that the first information 174 has been updated to the search device 160.

The search device 160 acquires the sensor information requested by the user from the sensor information 172 stored in the server-side storage device 170 by referring to the first information 174.

The search device 160 performs writing to the first information on the basis of the information extracted through the search. FIG. 6 is a diagram illustrating an example of content of the first information 174 updated by the search device 160. In the first information 174 illustrated in FIG. 6, a state of a variable "summary 1" is updated from an empty state to an integer sequence {40, 40, 40, 60, 150, 133, 115} of the sensor information obtained from the sensor that is a target. Here, the search device 160 updates the update flag of the first information 174 from "false" to "true".

Next, the server-side detection device 130 refers to the update flag of the first information 174, and notifies the server-side synchronization device 140 of the information indicating that the first information 174 has been updated when the update flag is "true". It should be noted that the server-side detection device 130 causes the update flag to return to "false" before the notification and updates the revision number. The above process is performed before the notification because the server-side synchronization device 140 manages the synchronization state according to whether or not the "revision number" and the "acknowledged revision number" match.

FIG. 7 is a diagram illustrating an example of content of the first information 174 updated by the server-side detection device 130. When the update flag is "true", the server-side detection device 130 causes the update flag to return to the state ("false") before the notification and adds 1 to the revision number of the first information 174.

The server-side synchronization device 140 receives the notification of the information indicating that the first information 174 has been updated from the server-side detection device 130, and extracts a row of which the revision number is greater than the acknowledged revision number from the first information 174. When one or more rows are extracted, the server-side synchronization device 140 transmits some of the extracted rows to the terminal-side synchronization device 223. Some of the rows are, for example, a variable, a state, and a revision number.

The terminal-side synchronization device 223 updates the state of the corresponding variable in the second information 254 on the basis of the updated data in the first information 174 received from the server-side synchronization device

Figures 8, 9:
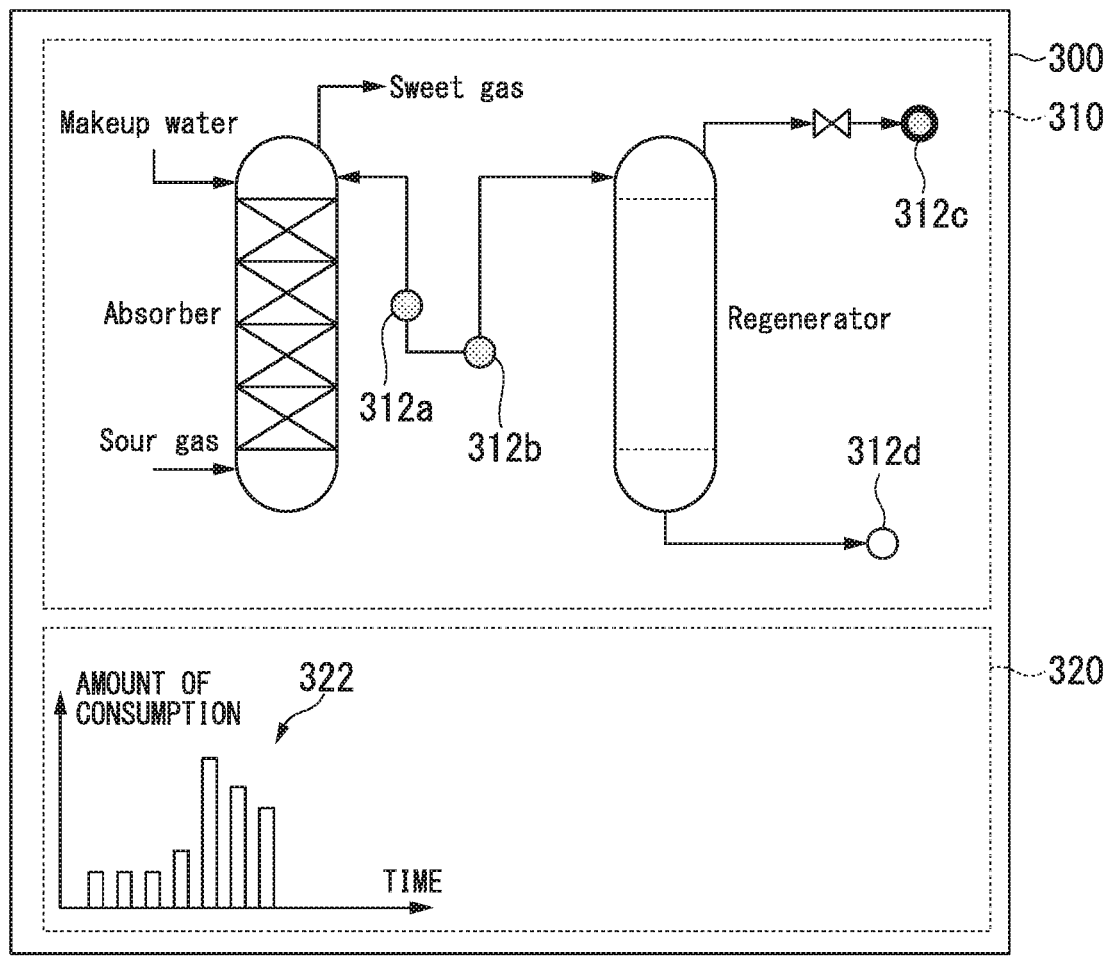
FIG. 8 is a diagram illustrating an example of the content of second information 254 updated by a terminal-side synchronization device 223.
FIG. 9 is a diagram illustrating an example of a screen displayed on a display device 240.

140. FIG. 8 is a diagram illustrating an example of content of the second information 254 updated by the terminal-side synchronization device 223. The terminal-side synchronization device 223 updates the state and the revision number of the second information 254 having the variable corresponding to the variable transmitted by the server-side synchronization device 140 with the state and the revision number transmitted by the server-side synchronization device 140. Specifically, for example, when the revision number transmitted from the server-side synchronization device 140 is equal to or greater than the revision number of the second information 254, the terminal-side synchronization device 223 updates the state and the revision number of the second information 254 with the state and the revision number transmitted by the server-side synchronization device 140.

Further, the terminal-side synchronization device 223 updates the acknowledged revision number with the same value as the revision number. Further, the terminal-side synchronization device 223 transmits a pair of the variable "summary 1" and acknowledged revision number "1" to the server-side synchronization device 140.

The server-side synchronization device 140 updates the "acknowledged revision number" of the row having the variable corresponding to the received variable in the first information 174. More specifically, for example, when the acknowledged revision number transmitted from the terminal-side synchronization device 223 is greater than the acknowledged revision number of the first information 174, the server-side synchronization device 140 updates the acknowledged revision number of the first information 174 with the acknowledged revision number transmitted by the terminal-side synchronization device 223. As a consequence, the variable "summary 1" of the updated first information 174 has the same "state", "revision number", "acknowledged revision number", and "update flag" as those of the second information 254 as illustrated in FIG. 8. This state is a state in which the first information 174 and the second information 254 are synchronized with each other.

The terminal-side synchronization device 223 outputs information indicating that the second information 254 has been updated, to the terminal-side detection device 222. The terminal-side detection device 222 notifies the terminal-side notification device 224 of the information indicating that the second information 254 has been updated.

The terminal-side notification device 224 acquires the information indicating that the second information 254 has been updated from the terminal-side detection device 222, and outputs the acquired information to the updating device 225. The updating device 225 acquires the updated second information 254 by referring to the second information 254, and causes the process execution device 226 to execute updating of the output target information 256.

Then, the display control device 227 draws information on the display device 240 on the basis of the output target information 256, and causes the display device 240 to display the drawn image.

FIG. 9 is a diagram illustrating an example of the screen displayed on the display device 240. An image 300 illustrated in FIG. 9 is, for example, an image displayed on a browser. In the image 300, a first area 310 and a second area 320 are shown. In the first area 310, for example, images 312*a* to 312*d* indicating four sensors provided in a gas processing plant that is monitored by the server 100 are shown in association with installation positions of the sensors. The display control device 227 acquires sensor information of the four sensors acquired from the server 100 from the output target information 256 and displays images with colors or patterns corresponding to the acquired sensor information in association with the images 312*a* to 312*d* indicating the four sensors. Accordingly, the user can easily ascertain states of the respective sensors.

Further, an image 322 in which the amount of power consumption over time is graphed is shown in the second area 320. Information for generating the image 322 may be, for example, information obtained from the second information 254 acquired from a server different from the server 100 that monitors the gas processing plant. That is, the display control device 227 causes information based on a plurality of pieces of second information obtained through synchronization with a plurality of servers connected to the network NW to be displayed on the screen of the display device 240.

It should be noted that in the first embodiment, for example, when the content of the second information 254 is updated on the basis of an input instruction of the user or the like via the API 230, the terminal 200 may perform a process of synchronization with the first information 174 on the basis of the revision number, the acknowledged revision number, the update flag, and the like of the second information 254. In this case, the first information 174 is synchronized with the second information 254 in a procedure reverse to the above-described procedure of synchronizing the second information 254 with the first information 174.

In this case, for example, the API 230 updates the state of the second information 254 and changes the update flag from "false" to "true". When the terminal-side detection device 222 detects that the update flag is "true", the terminal-side detection device 222 changes the update flag from "true" to "false" and updates the revision number. Thereafter, the terminal-side detection device 222 notifies the terminal-side synchronization device 223 that the second information 254 has been updated. The terminal-side synchronization device 223 transmits information indicating that the second information 254 has been updated, to the server-side synchronization device 140. When the server-side synchronization device 140 receives the information indicating that the second information 254 has been updated, the server-side synchronization device 140 synchronizes the first information 174 with the second information 254.

Figure 10:
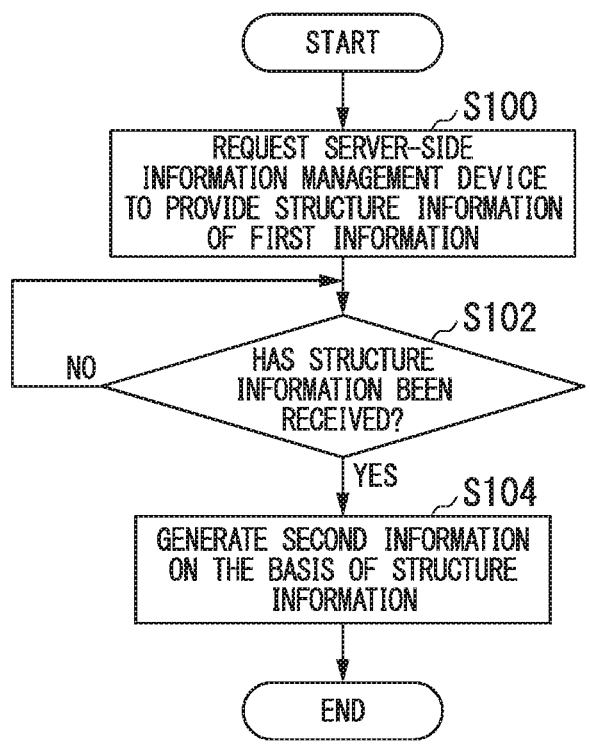
FIG. 10 is a flowchart showing an example of a process of a terminal-side information management device 221.

Next, a processing flow in each component of the first embodiment will be described. FIG. 10 is a flowchart showing an example of a process of the terminal-side information management device 221. The terminal-side information management device 221 requests the server-side information management device 120 to provide structure information including a type, an ID and a value of the first information 174 (step S100). Then, the terminal-side information management device 221 determines whether or not the structure information has been received from the server-side information management device 120 (step S102). The terminal-side information management device 221 waits until the terminal-side information management device 221 receives the structure information, and when the terminal-side information management device 221 receives the structure information, the terminal-side information management device 221 generates the second information 254 on the basis of the received structure information (step S104). As a result, the process of this flowchart ends.

Figure 11:
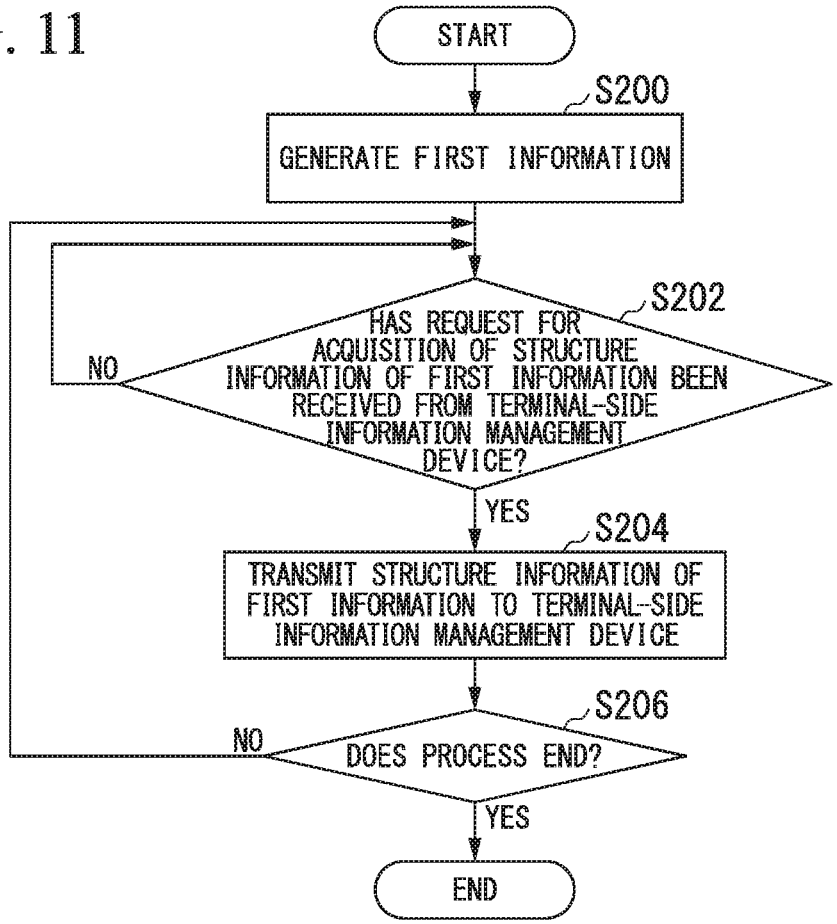
FIG. 11 is a flowchart showing an example of a process of a server-side information management device 120.

FIG. 11 is a flowchart showing an example of a process of the server-side information management device 120. The server-side information management device 120 generates the first information 174 (step S200). Then, the server-side information management device 120 determines whether or not a request for acquisition of the structure information of the first information 174 has been received from the terminal-side information management device 221 (step S202). The server-side information management device 120 waits until the server-side information management device 120 receives the request for acquisition of the structure information of the first information from the terminal-side information management device 221, and when the server-side information management device 120 receives the request for acquisition, the server-side information management device 120 transmits the structure information of the first information 174 to the terminal-side information management device 221 (step S204).

Then, the server-side information management device 120 determines whether or not the process ends (step S206). When the process does not end, the server-side information management device 120 returns to the process of step S202. Further, for example, when the process ends, for example, due to the server 100 being stopped, the server-side information management device 120 ends the process of this flowchart.

Figure 12:
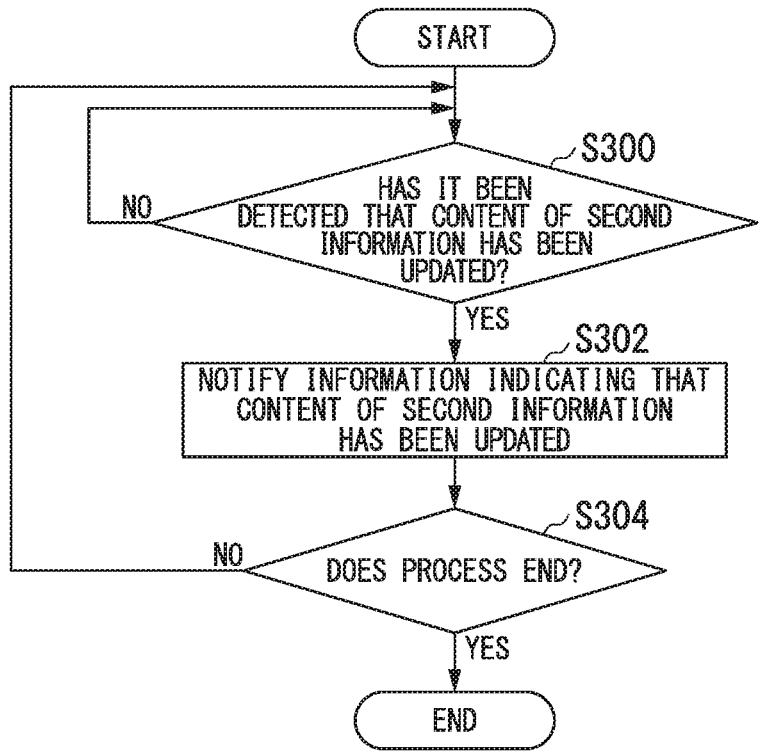
FIG. 12 is a flowchart showing an example of a process of a terminal-side detection device 222.

FIG. 12 is a flowchart showing an example of a process of the terminal-side detection device 222. The terminal-side detection device 222 determines whether or not the content of the second information 254 has been updated (step S300). The terminal-side detection device 222 waits until the terminal-side detection device 222 detects that the content of the second information 254 has been updated, and when the terminal-side detection device 222 detects that the content of the second information 254 has been updated, the terminal-side detection device 222 notifies the terminal-side synchronization device 223 and the terminal-side notification device 224 of information indicating that the content of the second information 254 has been updated (step S302).

Then, the terminal-side detection device 222 determines whether or not the process ends (step S304). When the process does not end, the terminal-side detection device 222 returns to the process of step S300. Further, for example, when an execution context of the browser screen displayed on the display device 240 ends, the terminal-side detection device 222 ends the process of this flowchart. The execution context is, for example, a process that is executed on a web page displayed on the browser screen.

Figure 13:
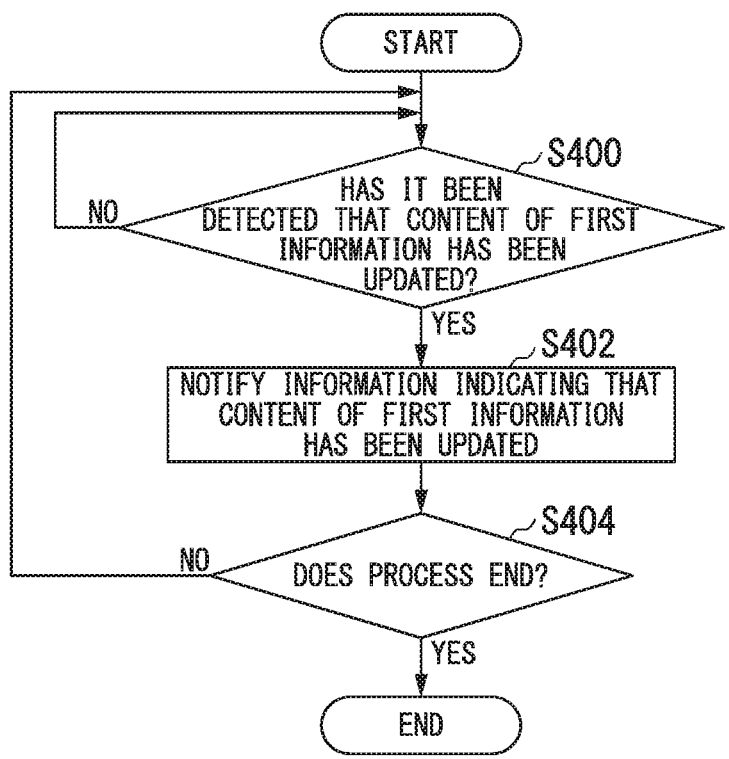
FIG. 13 is a flowchart showing an example of a process of a server-side detection device 130.

FIG. 13 is a flowchart showing an example of a process of the server-side detection device 130. The server-side detection device 130 determines whether or not it is detected that the content of the first information 174 has been updated (step S400). The server-side detection device 130 waits until the server-side detection device 130 detects that the content of the first information 174 has been updated, and when server-side detection device 130 detects that the content of the first information 174 has been updated, the server-side detection device 130 notifies the server-side synchronization device 140 and the server-side notification device 150 of information indicating that the content of the first information 174 has been updated (step S402).

Then, the server-side detection device 130 determines whether or not the process ends (step S404). When the process does not end, the server-side detection device 130 returns to the process of step S400. Further, for example, when the process ends, for example, due to the server 100 being stopped, the server-side information management device 120 ends the process of this flowchart.

Figure 14:
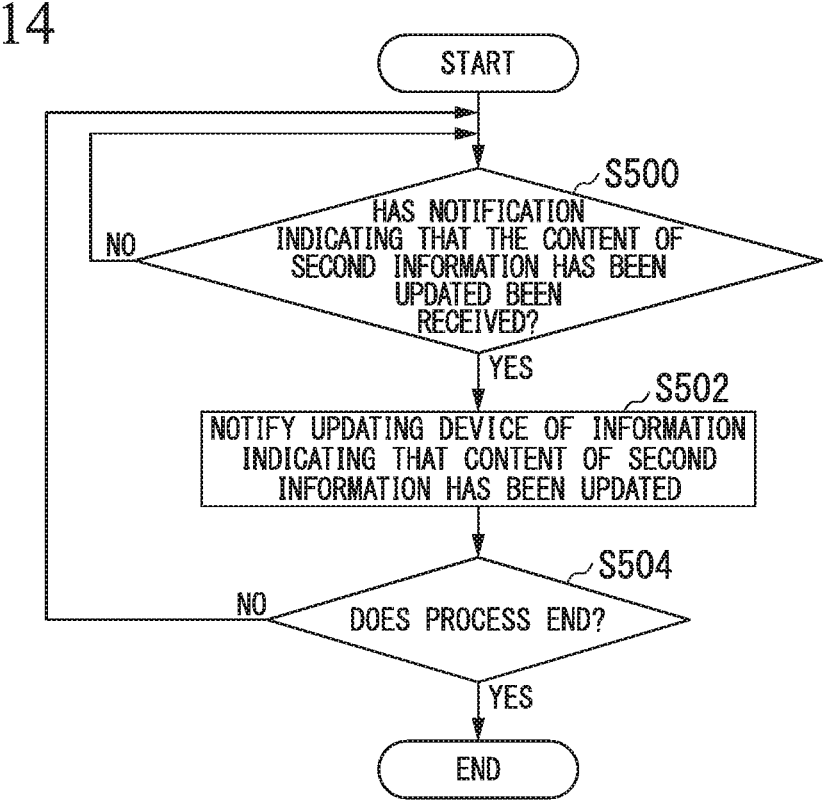
FIG. 14 is a flowchart showing an example of a process of a terminal-side notification device 224.

FIG. 14 is a flowchart showing an example of a process of the terminal-side notification device 224.

The terminal-side notification device 224 determines whether or not the notification indicating that the content of the second information 254 has been updated has been received (step S500). The terminal-side notification device 224 waits until the terminal-side notification device 224 receives the information indicating that the content of the second information 254 has been updated, and when the terminal-side notification device 224 receives the notification, the terminal-side notification device 224 notifies the updating device 225 of information indicating that the content of the second information 254 has been updated (step S502).

Then, the terminal-side notification device 224 determines whether or not the process ends (step S504). When the process does not end, the terminal-side notification device 224 returns to the process of step S500. Further, for example, when an execution context of the browser screen of the display device 240 ends, the terminal-side notification device 224 ends the process of this flowchart.

Figure 15:
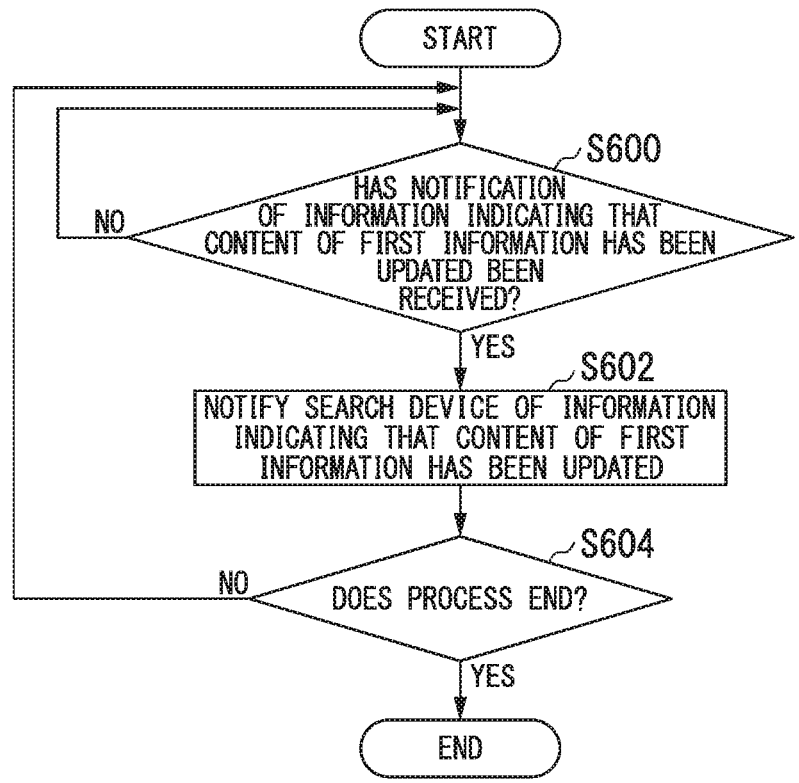
FIG. 15 is a flowchart showing an example of a process of a server-side notification device 150.

FIG. 15 is a flowchart showing an example of a process of the server-side notification device 150. The server-side notification device 150 determines whether or not the notification of information indicating that the content of the first information 174 has been updated has been received (step S600). The server-side notification device 150 waits until the server-side notification device 150 receives the notification of information indicating that the content of the first information 174 has been updated, and when the server-side notification device 150 receives the notification, the server-side notification device 150 notifies the search device 160 of information indicating that the content of the first information 174 has been updated (step S602).

Then, the server-side notification device 150 determines whether or not the process ends (step S604). When the process does not end, the server-side notification device 150 returns to the process of step S600. Further, the server-side notification device 150 ends the process of this flowchart, for example, when the process ends due to the server 100 being stopped.

Figure 16:
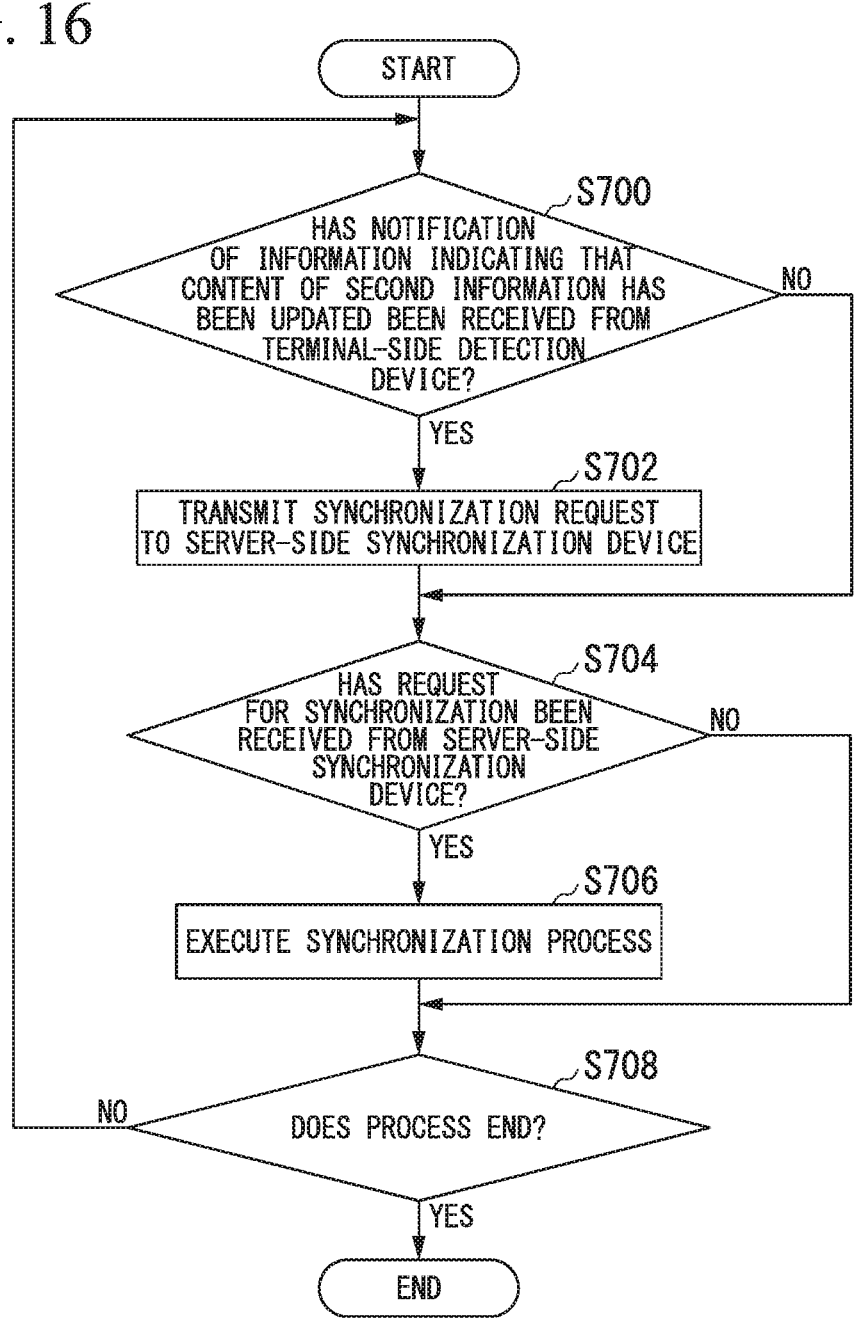
FIG. 16 is a flowchart showing an example of a process of a terminal-side synchronization device 223.

FIG. 16 is a flowchart showing an example of a process of the terminal-side synchronization device 223. The terminal-side synchronization device 223 determines whether or not the notification of information indicating that the content of the second information 254 has been updated has been received from the terminal-side detection device 222 (step S700). When the terminal-side synchronization device 223 receives the notification of the information indicating that the content of the second information 254 has been updated, the terminal-side synchronization device 223 transmits a synchronization request to the server-side synchronization device 140 (step S702). Then, the terminal-side synchronization device 223 determines whether or not a synchronization request has been received from the server-side synchronization device 140 (step S704). When the terminal-side synchronization device 223 receives the synchronization request, the terminal-side synchronization device 223 executes a processing of synchronization with the server-side synchronization device 140 (step S706).

Next, the terminal-side synchronization device 223 determines whether or not the process ends (step S708). When the process does not end, the terminal-side synchronization device 223 returns to the process of step S700. Further, for example, when the execution context of the browser screen of the display device 240 ends, the terminal-side synchronization device 223 ends the process of this flowchart.

Figure 17:
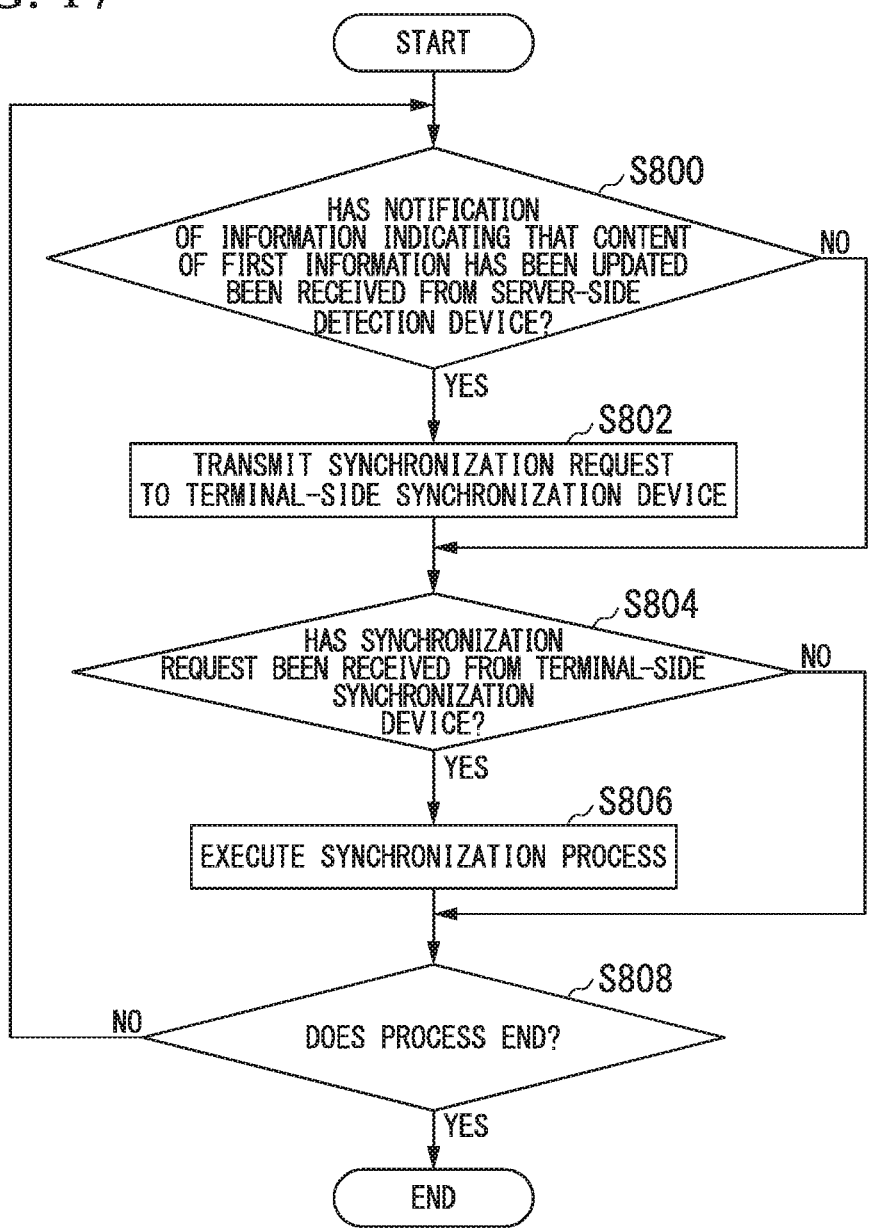
FIG. 17 is a flowchart showing an example of a process of a server-side synchronization device 140.

FIG. 17 is a flowchart showing an example of a process of the server-side synchronization device 140. The server-side synchronization device 140 determines whether or not the notification of information indicating that the content of the first information 174 has been updated has been received from the server-side detection device 130 (step S800). When server-side synchronization device 140 receives the notification of the information indicating that the content of the first information 174 has been updated, the server-side synchronization device 140 transmits the synchronization request to the terminal-side synchronization device 223 (step S802). Then, the server-side synchronization device 140 determines whether or not the synchronization request has been received from the terminal-side synchronization device 223 (step S804). When the server-side synchronization device 140 receives the synchronization request, the server-side synchronization device 140 executes a process of synchronization with the terminal-side synchronization device 223 (step S806).

Then, the server-side synchronization device 140 determines whether or not the process ends (step S808). When the process does not end, the server-side synchronization device 140 returns to the process of step S800. Further, when the server-side synchronization device 140 ends the process, for example, due to the server 100 being stopped, the server-side synchronization device 140 ends the process of this flowchart.

As described above, according to the first embodiment, the continuity of use of the web application system 1 can be improved. Specifically, according to the first embodiment, when a process of acquiring information from the server 100 is performed according to execution of the web application (for example, a process of a loop in a dotted line portion illustrated in FIG. 4 is performed), there is no crossing of a network boundary between the terminal 200 and the server 100. Therefore, it is possible to maintain the continuity of an operation at the time of disconnection of communication in the terminal 200.

Second Embodiment

Next, a second embodiment of the web application system will be described. In the following description, the same names and reference numerals are used for components having the same functions as those of the first embodiment, and detailed description thereof will be omitted.

Figure 18:
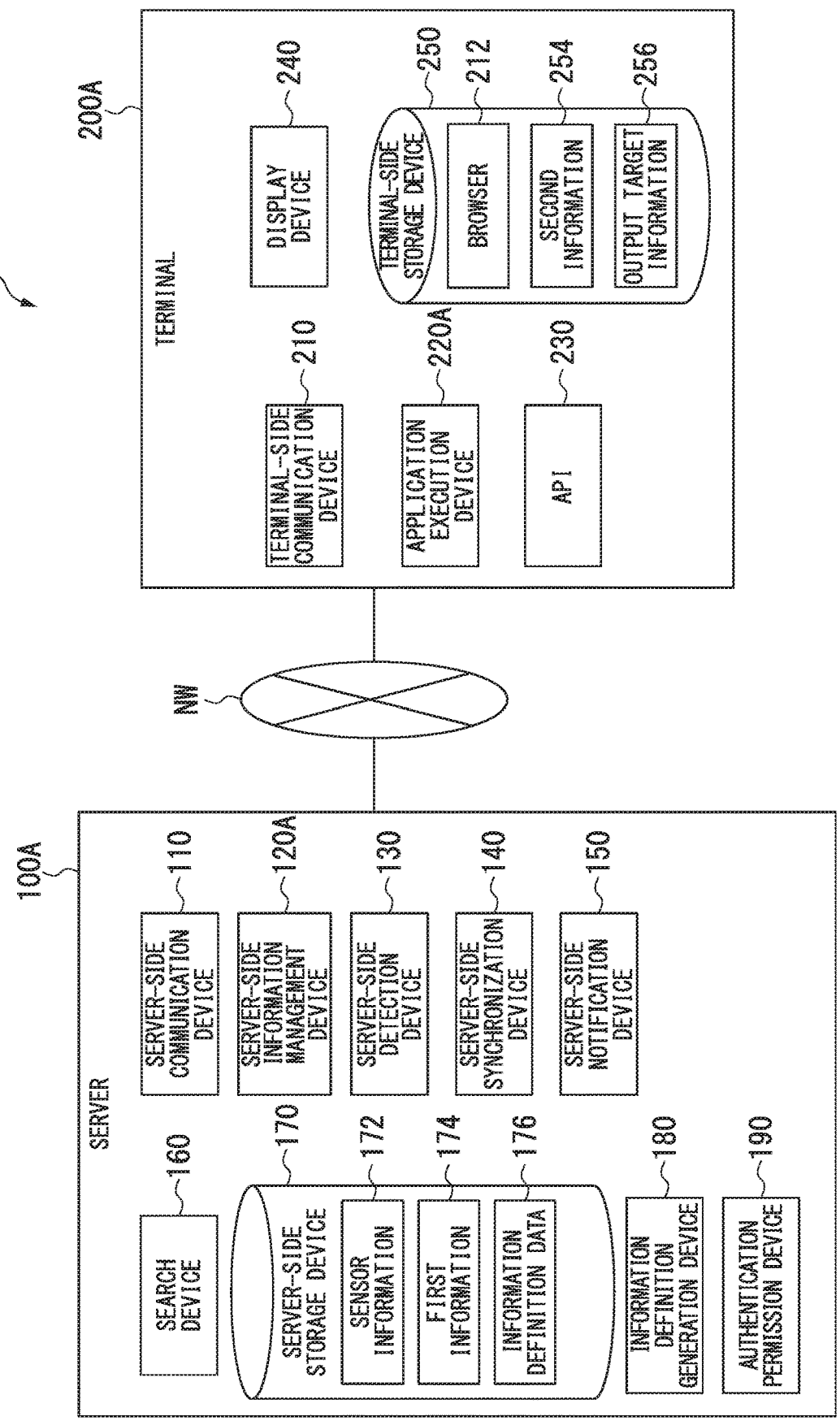
FIG. 18 is a diagram illustrating an example of a web application system 2 according to a second embodiment.

FIG. 18 is a diagram illustrating an example of a web application system 2 according to the second embodiment. The web application system 2 includes a server 100A and a terminal 200A. The server 100A includes an information definition generation device 180, an authentication permission device 190, and a server-side information management device 120A. Further, the terminal 200A includes an application execution device 220A. Functions of other components are the same as those in the first embodiment.

The information definition generation device 180 defines an authentication permission level for each user of the terminal 200 in each variable of the first information 174, and stores the authentication permission level in the server-side storage device 170 as the information definition data 176. Details of a function of the information definition generation device 180 will be described below.

The authentication permission device 190 performs, for example, authentication of the user (the terminal 200) and permission of data use based on an access authority of the user on the basis of a communication protocol such as hypertext transfer protocol (HTTP). For example, the authentication permission device 190 performs the authentication and the permission using a user ID, a password, or the like input from the terminal 200.

The server-side information management device 120A selects information definition data of the variable permitted for a user from the information definition data 176 stored in the server-side storage device 170 on the basis of the authentication permission information obtained by the authentication permission device 190, and generates the first information 174 on the basis of the selected information definition data. Thus, in the second embodiment, for example, the information definition data is selected on the basis of HTTP-based authentication permission information, and the first information 174 is generated on the basis of the selected information definition data, and accordingly, an authentication permission result is reflected in the first information 174.

Figure 19:
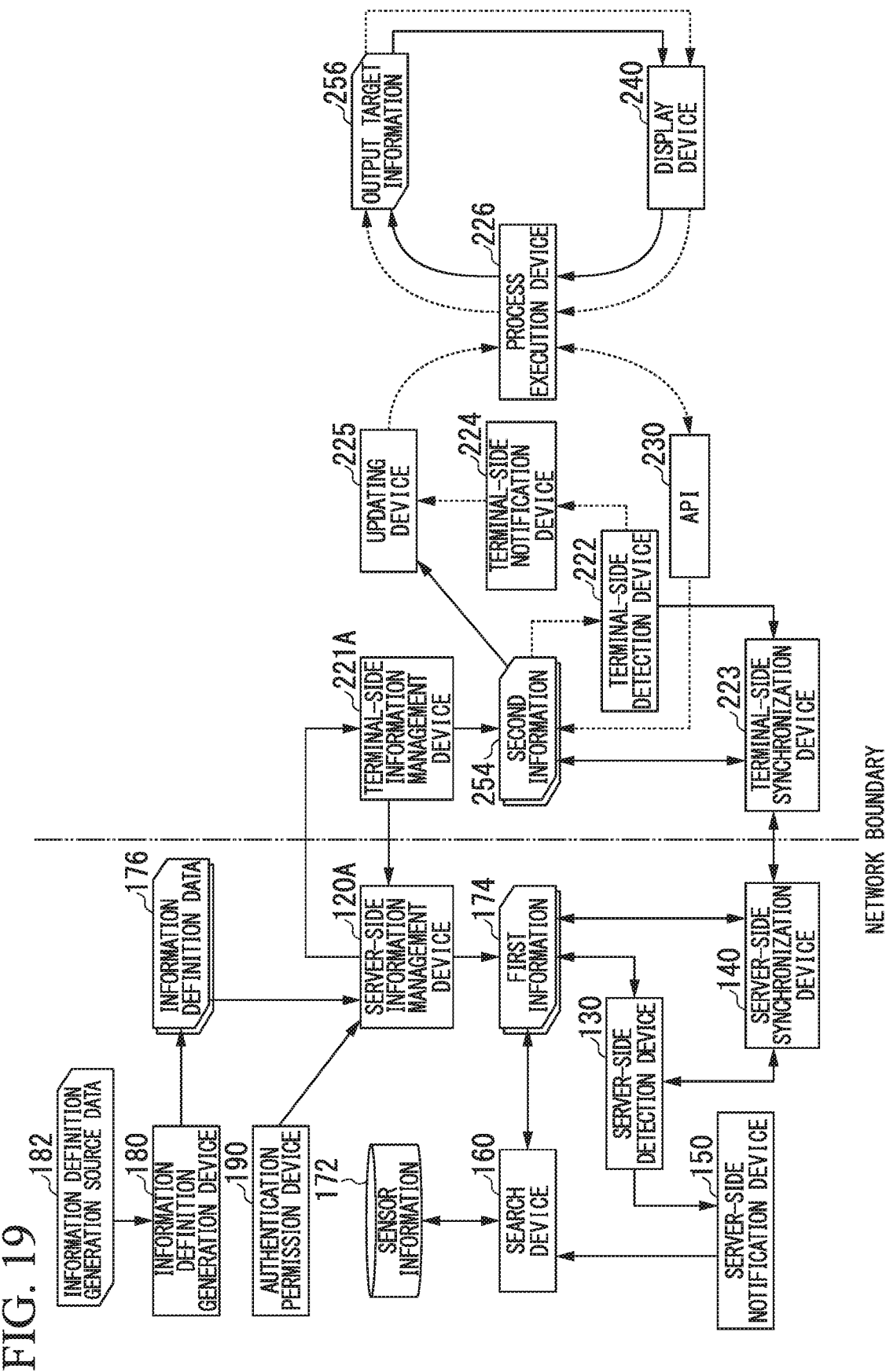
FIG. 19 is a diagram illustrating an architecture of the web application system 2 according to the second embodiment.

Next, the architecture of the web application system 2 will be described with reference to the drawings. FIG. 19 is a diagram illustrating the architecture of the web application system 2 according to the second embodiment.

In the example of FIG. 19, the information definition generation device 180 acquires the information definition generation source data 182 from a server administrator or an external device connected via the network NW, and generates the information definition data 176 on the basis of the acquired information definition generation source data 182.

FIG. 20 is a diagram illustrating an example of the content of the information definition generation source data 182. In the example of FIG. 20, two program codes 182A and 182B are shown as the information definition generation source data 182.

The program code 182A associates a class "Power" with an address "/power". Further, in the program code 182B, an administrator (ADMIN) level being included as permission information for an access authority is used as a condition.

In the example of FIG. 20, the information definition generation device 180, for example, searches for a class in which there is a designation of @ Controller and extracts a Power class and a PowerAdmin class. Further, the information definition generation device 180 searches for variables within the Power class and the PowerAdmin class, and acquires, for example, a variable "summary" of an SList <Integer>type. Further, the information definition generation device 180 generates the information definition data 176 of the Power class and the PowerAdmin class in order for the terminal 200 to generate copies of the Power class and the PowerAdmin class.

FIG. 21 is a diagram illustrating an example of the content of the information definition data 176. The information definition data 176 includes, for example, information on a target class, authentication, permission, a type of variable, a variable name, and writing availability.

The information definition generation device 180 associates information definition of a Power class and a PowerAdmin class with the server-side information management device 120A that performs processing on an address such as "/power" so that the Power class and the PowerAdmin class can be requested from the terminal 200 via an HTTP.

For example, the terminal-side information management device 221A of the application execution device 220A outputs a data request (for example, HTTP GET) to an address "/power" through HTTP in order to generate a copy of the Power class. In this case, since the address to which the data request has been made is "/power", the to process of the server-side information management device 120A is started.

The server-side information management device 120A performs authentication permission in the authentication permission device 190. When the authentication of the user of the terminal 200 is "required" (a logged state) and the user has an authority in which the permission is "ADMIN", the server-side information management device 120A selects the information definition data 176 of the PowerAdmin class. It should be noted that when the authentication permission condition described above is not satisfied, the server-side information management device 120A may select the information definition data 176 of the Power class. Further, the server-side information management device 120A generates an instance (the first information 174) corresponding to a class (Power or PowerAdmin) that is a target on the basis of the selected information definition data 176.

Further, the server-side information management device 120A acquires information corresponding to a variable name "summary" and stores the information in the first information 174. The server-side information management device 120A transmits the information definition data and the structure information of the first information 174 to the terminal-side information management device 221A.

The terminal-side information management device 221A generates second information 254 having the same structure information as the first information 174 on the basis of the information definition and the structure information that have been received.

Figure 22:
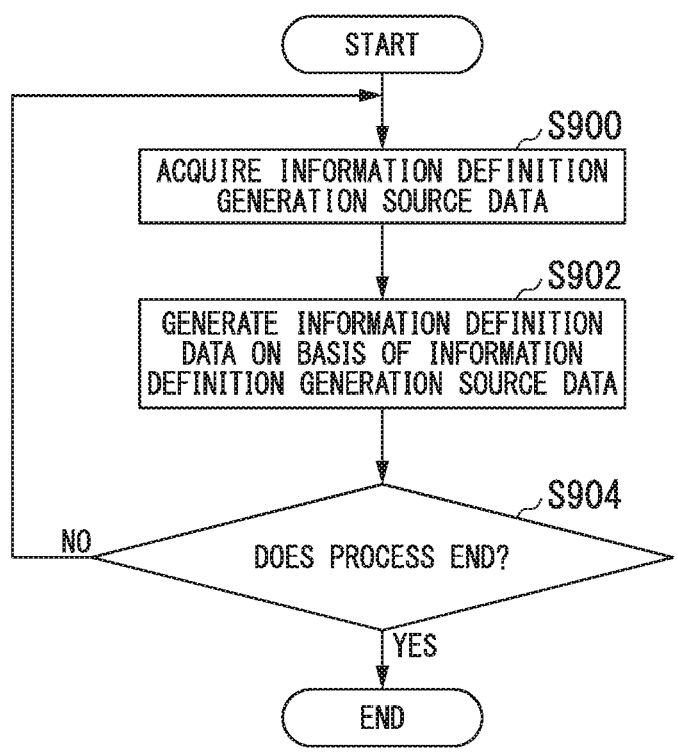
FIG. 22 is a flowchart showing an example of a process of an information definition generation device 180.

Next, a processing flow in the information definition generation device 180 and the server-side information management device 120A of the second embodiment will be described. FIG. 22 is a flowchart showing an example of a process of the information definition generation device 180. The information definition generation device 180 acquires the information definition generation source data 182 for generating the information definition data 176 (step S900) and generates the information definition data 176 on the basis of the acquired information definition generation source data 182 (step S902).

Then, the information definition generation device 180 determines whether or not the process ends (step S904). When the process does not end, the information definition generation device 180 returns to the process of step S900. Further, for example, when the process ends due to the server 100 being stopped or the like, the information definition generation device 180 ends the process of this flowchart.

Figure 23:
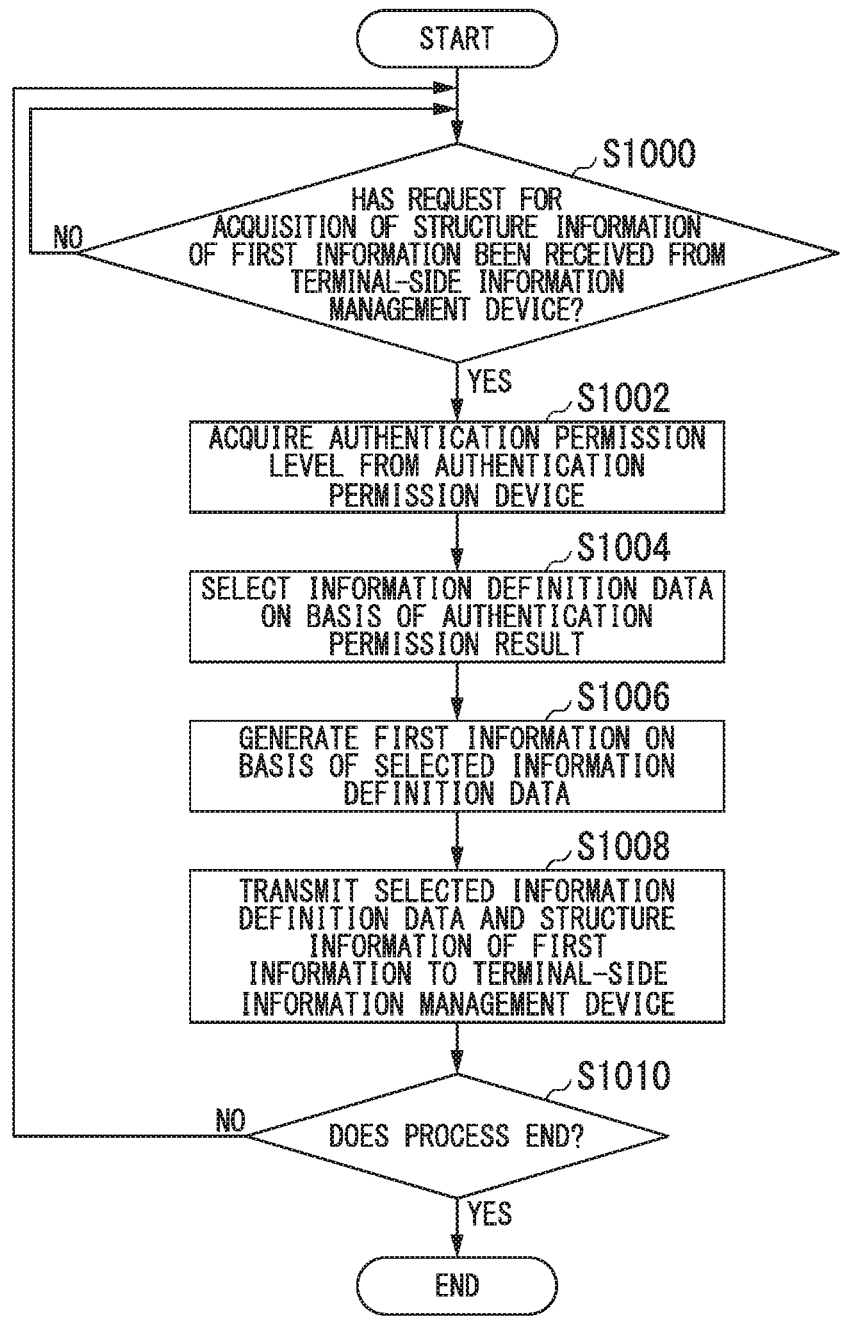
FIG. 23 is a flowchart showing an example of a process of a server-side information management device 120A according to the second embodiment.

FIG. 23 is a flowchart showing an example of a process of the server-side information management device 120A of the second embodiment. The server-side information management device 120A determines whether or not a request for acquisition of the structure information of the first information 174 has been received from the terminal-side information management device 221A (step S1000). The server-side information management device 120A waits until the server-side information management device 120A receives the request for acquisition of the structure information of the first information 174, and when the server-side information management device 120A receives the acquisition request, the server-side information management device 120A causes the authentication permission device 190 to execute an authentication permission process for the user on the basis of a communication protocol such as HTTP, and acquire authentication permission level from the authentication permission device 190 (step S1002).

Then, the server-side information management device 120A selects information definition data that is a target from the information definition data 176 stored in the server-side storage device 170 on the basis of an authentication permission result from the authentication permission device 190 (step S1004), and generates the first information 174 on the basis of the selected information definition data (step S1006).

Then, the server-side information management device 120A transmits the selected information definition data and the structure information of the first information to the terminal-side information management device 221A (step S1008).

Then, the server-side information management device 120A determines whether or not the process ends (step S1010). When the process does not end, the server-side information management device 120A returns to the process of step S1000. Further, when the server-side information management device 120A ends process, for example, due to the server 100 being stopped, the server-side information management device 120A ends the process of this flowchart. Through execution of the process illustrated in FIG. 23, the terminal-side information management device 221A generates the second information 254 having the same structure information as the first information on the basis of the information definition data and the structure information transmitted from the server-side information management device 120A.

As described above, according to the second embodiment, the first information 174 can be generated on the basis of the authentication permission information acquired by the HTTP-based authentication permission device 190, in addition to obtaining the same effects as those of the first embodiment. Accordingly, since the first information 174 includes the authentication permission information, it is not necessary for HTTP to be used in the synchronization process in which responsiveness is required, and it is possible to rapidly execute the synchronization process. Further, according to the second embodiment, it is not necessary for a unique authentication permission process to be performed in a communication path that is used at the time of synchronization process, push communication from a server to a terminal can be realized, and as a result, high responsiveness can be realized.

Third Embodiment

Next, a third embodiment of the web application system will be described. In the third embodiment, a process when an abnormality such as communication disconnection has occurred between the server 100 and the terminal 200 will be described. In the following description, description will be given using the configuration of the web application system 2 in the second embodiment as an example, but the same can apply to the first embodiment.

In the third embodiment, the server-side synchronization device 140 extracts a row of which the revision number is greater than the acknowledged revision number from the first information 174. When one or more lines are extracted, the server-side synchronization device 140 transmits some of the extracted rows to the terminal-side synchronization device 223. Here, it is assumed that the server-side synchronization device 140 detects that the communication with the terminal-side synchronization device 223 has been disconnected. The "communication is disconnected" is, for example, a case in which a reception strength of radio waves is equal to or lower than a predetermined value in radio communication and transmission and reception of data cannot be performed or a case in which transmission and reception of data is temporarily stopped due to excessive communication of the network NW. Further, the "communication is disconnected" may include a case in which a power supply of the terminal 200 is off or a case in which there is no expectation of early recovery of the communication due to hardware-related reasons such as failure of the server-side communication device 110 or the terminal-side communication device 210.

Here, for example, when the server-side synchronization device 140 fails to transmit the extracted row due to the communication disconnection, the server-side synchronization device 140 repeats the extraction of the above-described row and the transmission of the extracted row at every predetermined time. Accordingly, when the communication is recovered, the process of synchronization between the first information 174 and the second information 254 is resumed.

It should be noted that the server-side synchronization device 140 may perform management by assigning a monotonously increasing unique number (for example, message number) to each pieces of data to be transmitted. In this case, the terminal-side synchronization device 223 stores the message number when the communication with the server-side synchronization device 140 has been disconnected, and transmits the stored message number to the server-side synchronization device 140 when the communication with the server-side synchronization device 140 is recovered. Accordingly, the server-side synchronization device 140 can ascertain data that the terminal-side synchronization device 223 has received and can retransmit unreceived data. Accordingly, the web application system 2 can improve resistance to communication disconnection.

Further, when the server-side synchronization device 140 detects that the communication with the terminal-side synchronization device 223 has been disconnected, the server-side synchronization device 140 outputs information indicating that the communication has been disconnected, to the server-side information management device 120A. The server-side information management device 120A determines whether or not a predetermined time has elapsed after the server-side information management device 120A receives the information indicating that the communication has been disconnected from the server-side synchronization device 140. When the predetermined time has elapsed and a communication disconnection state continues, the server-side information management device 120A discards the first information 174.

Further, the server-side information management device 120A may discard the first information 174 when the state of disconnection of the communication of the terminal 200 satisfies a predetermined condition. The predetermined condition is, for example, a case in which a power supply of the terminal 200 is off. Thus, it is possible to suppress holding of unnecessary information for a long period of time.

Further, when the terminal-side synchronization device 223 of the application execution device 220A detects that the communication with the server-side synchronization device 140 has been disconnected, the terminal-side synchronization device 223 of the application execution device 220A notifies the terminal-side information management device 221A of information indicating that the communication has been disconnected. When the terminal-side information management device 221A receives the notification of the information indicating that the communication has been disconnected from the server-side synchronization device 140, the terminal-side information management device 221A transmits a request for recovery of the second information 254 to the server-side information management device 120A.

Further, the terminal-side synchronization device 223 may detect that the communication has been recovered after the communication with the server-side synchronization device 140 has been disconnected. In this case, when the terminal-side synchronization device 223 detect that the communication has been recovered, the terminal-side synchronization device 223 notifies the terminal-side information management device 221A of information indicating that the recovery has been detected. When the terminal-side information management device 221A receives the notification of the information indicating that the communication has been recovered from the terminal-side synchronization device 223, the terminal-side information management device 221A may transmit a request for recovery of the second information 254 to the server-side information management device 120A.

When the server-side information management device 120A receives the request for recovery from the terminal-side information management device 221A, the server-side information management device 120A causes the server-side synchronization device 140 to synchronize the first information 174 with the second information 254. It should be noted that when the request for recovery is received and the first information 174 has already been discarded, the server-side information management device 120A may newly generate the first information 174 using the previous information definition data 176 corresponding to the terminal 200 and transmit the structure information of the generated first information 174 to the terminal-side information management device 221A. The previous information definition data 176 corresponding to the terminal 200 is stored, for example, in the server-side storage device 170.

Figure 24:
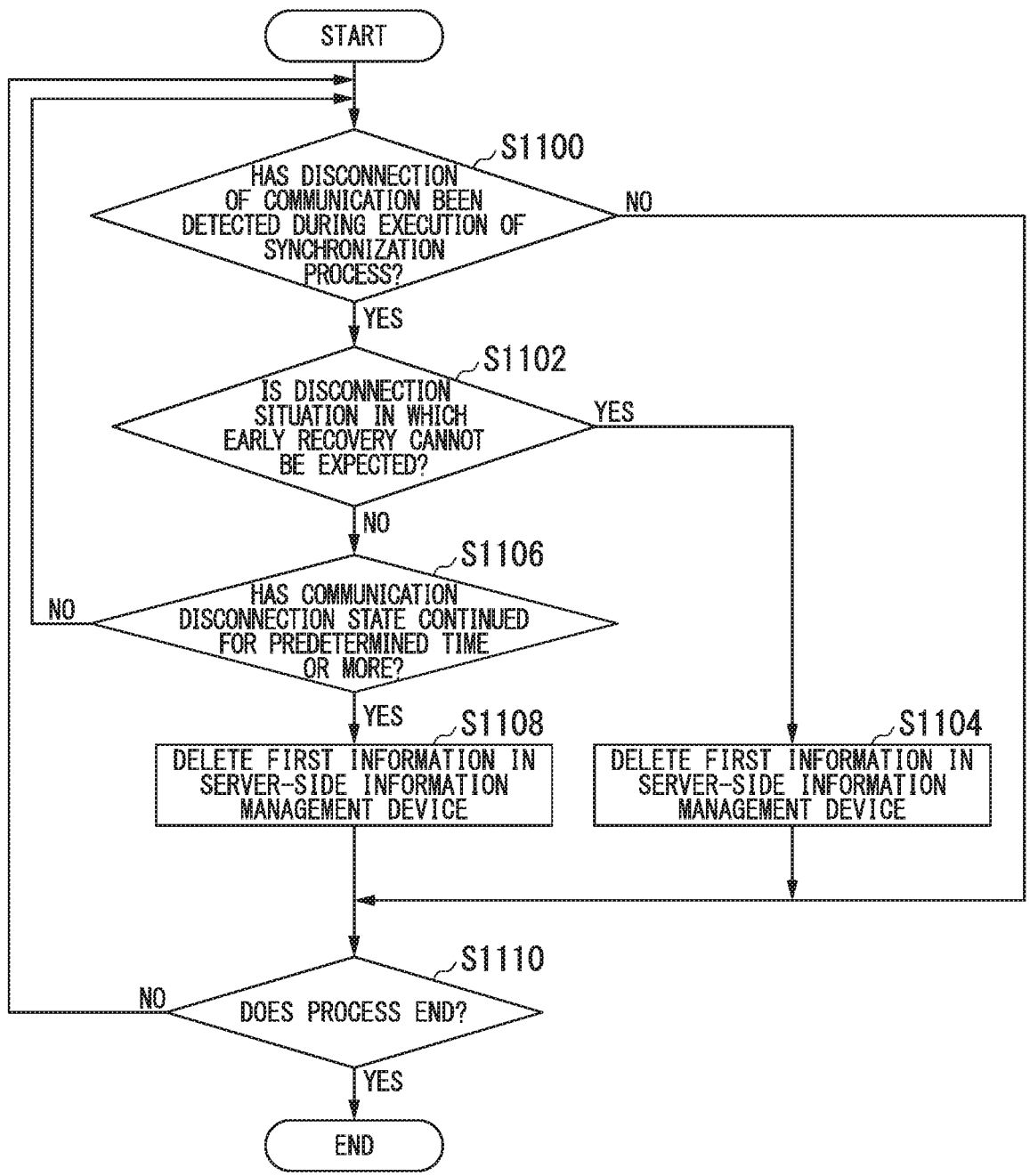
FIG. 24 is a flowchart showing an example of a process of a server-side synchronization device 140.

Next, a processing flow of the server-side synchronization device 140 and the terminal-side synchronization device 223 of the third embodiment will be described. FIG. 24 is a flowchart showing an example of the process of the server-side synchronization device 140. For example, the server-side synchronization device 140 determines whether or not a disconnection of communication with the terminal-side synchronization device 223 has been detected during the execution of the synchronization process (step S1100).

Next, when the disconnection of the communication has been detected, the server-side synchronization device 140 determines whether or not a disconnection situation is a situation in which early recovery cannot be expected (step S1102). When the early recovery cannot be expected, the server-side synchronization device 140 causes the server-side information management device 120A to delete the first information (step S1104). Further, when the disconnection situation is a situation in which the early recovery can be expected, the server-side synchronization device 140 determines whether or not a communication disconnection state has continued for a predetermined time or more (step S1106).

When the communication disconnection state has not continued for the predetermined time or more, the process returns to the process of step S1100. When the communication disconnection state has continued for the predetermined time or more, the server-side synchronization device 140 causes the server-side information management device 120A to discard the first information (step S1108).

Next, the server-side synchronization device 140 determines whether or not the process ends when the communication disconnection is not detected in the process of step S1100 or after the process of step S1104 or step S1108 (step S1110). When the process does not end, the process returns to step S1100. Further, when the synchronization between the first information 174 and the second information 254 is completed or when the process ends, for example, due to the server being stopped, the server-side synchronization device 140 ends the process of this flowchart.

Figure 25:
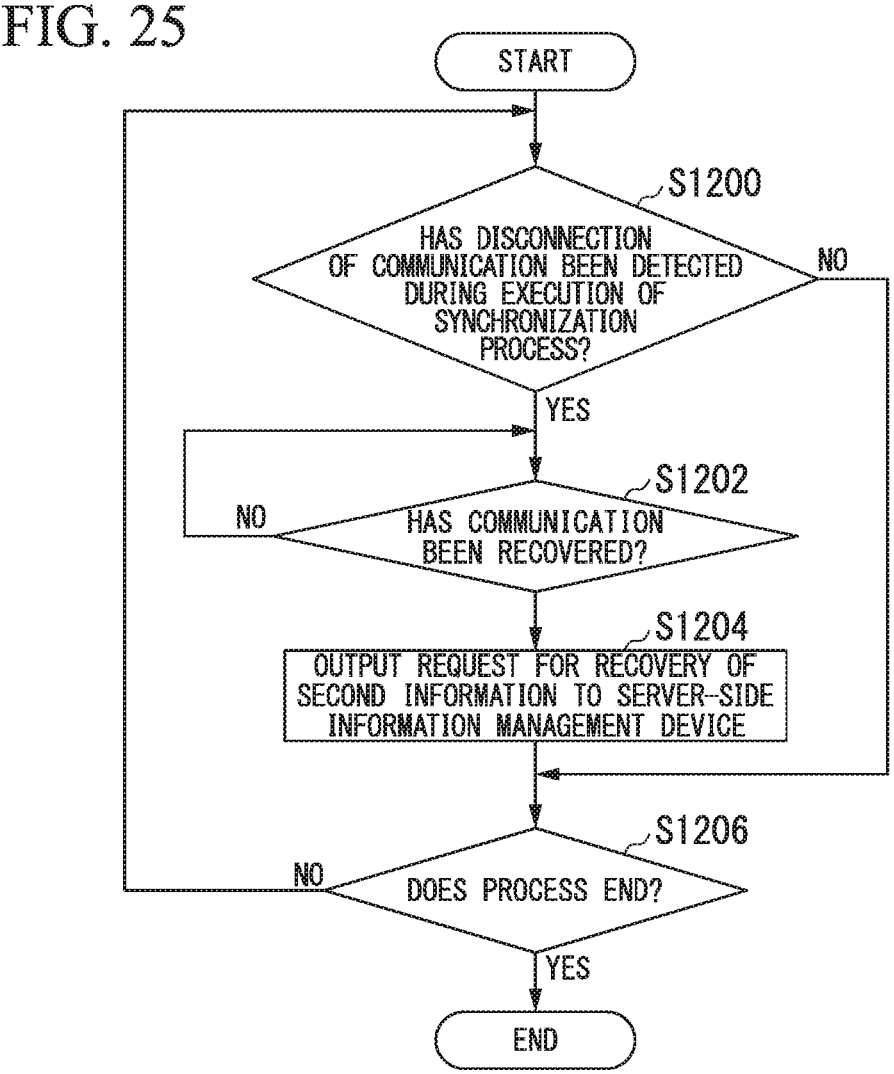
FIG. 25 is a flowchart showing an example of a process of a terminal-side synchronization device 223.

FIG. 25 is a flowchart showing an example of a process of the terminal-side synchronization device 223. In step S1200, the terminal-side synchronization device 223 determines, for example, whether or not a disconnection of communication with the server-side synchronization device 140 has been detected during execution of the synchronization process (step S1200). When the disconnection of communication has been detected, the terminal-side synchronization device 223 determines whether or not the communication is recovered (step S1202).

When the communication is not recovered, the terminal-side synchronization device 223 waits until the communication is recovered, and outputs a request for recovery of the second information 254 to the server-side information management device 120 when the communication is recovered (step S1204). Then, when the to communication disconnection is not detected in the process of step S1200 or after the process of step S1204, the terminal-side synchronization device 223 determines whether or not the process ends (step S1206). When the process does not end, the terminal-side synchronization device 223 returns to the process of step S1200. Further, when the process ends due to end of the execution context or the like, the terminal-side synchronization device 223 ends the process of this flowchart.

According to the third embodiment described above, it is possible to rapidly perform the synchronization process after the communication recovery even when an abnormality in the communication has occurred, in addition to obtaining the same effects as those of the first and second embodiments. Therefore, it is possible to improve the stability of the web application system.

According to at least one embodiment described above, the web application system includes the server 100 including the search device 160 that updates the first information 174 stored in the server-side storage device 170 on the basis of the server-side event, the server-side detection device 130 that detects that the first information 174 has been updated, and the server-side synchronization device 140 that notifies the terminal 200 of the information indicating that the first information 174 has been updated when the server-side detection device 130 detects that the first information 174 has been updated, and the terminal 200 including the application execution device 220 that functions by a web application being executed, the application execution device 220 including the terminal-side synchronization device 223 that starts synchronization of the second information 254 stored in the terminal-side storage device 250 with the first information 174 when the information indicating that the first information 174 has been updated is received from the server 100, and the process execution device 226 that executes the process based on the second information according to the operation of the user, thereby improving the continuity of use.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A web application system comprising:
a server including
a server-side updating device that updates first information stored in a server-side storage device on the basis of a server-side event;
a server-side detection device that detects that the first information has been updated; and
a server-side synchronization device that notifies a terminal of information indicating that the first information has been updated when the server-side detection device detects that the first information has been updated, and
the terminal including an application execution device that functions by a web application being executed, the application execution device including a terminal-side synchronization device that starts synchronization of second information stored in a terminal-side storage device with the first information when information indicating that the first information has been updated is received from the server, and a process execution device that executes a process based on the second information according to an operation of a user,
wherein the first information and the second information include a variable name, a value of a variable, a revision number associated with updating of the variable, and an acknowledged revision number for determining whether or not the first information and the second information have been synchronized, which are used in the server-side event;
wherein the web application system further comprises,
a server-side information management device that generates the first information; and
a terminal-side information management device that generates the second information on the basis of structure information of the first information obtained from the server-side information management device.

2. The web application system according to claim 1, wherein the first information further includes an update flag, and
the server-side detection device detects that the value of the variable of the first information has been updated by detecting that the update flag is changed.

3. The web application system according to claim 1, wherein the server-side synchronization device synchronizes the second information with the first information when the revision number of the first information does not match the acknowledged revision number, and matches the acknowledged revision number of the first information with a value of the revision number when synchronization of the second information with the first information is completed.

4. The web application system according to claim 1, wherein the application execution device notifies the server of information indicating that the second information has been updated when the application execution device detects that a content of the second information has been updated, and performs synchronization with the second information stored in the terminal.

5. The web application system according to claim 4,
wherein the second information includes the variable name used in the server-side event, the value of the variable, the revision number, the acknowledged revision number, and an update flag, and
the application execution device detects that the value of the variable of the second information has been updated by detecting that the update flag has been changed.

6. The web application system according to claim 1,
wherein the server-side synchronization device detects that communication with the terminal has been disconnected, and
the server-side information management device discards the first information when a predetermined time has elapsed after the server-side synchronization device has detected that the communication has been disconnected.

7. The web application system according to claim 1, wherein the server-side information management device discards the first information on the basis of a state of the disconnection of communication with the terminal.

8. The web application system according to claim 1,
wherein the application execution device detects that communication with the server has been disconnected, and
the terminal-side information management device requests the server-side information management device to perform recovery of the second information when the application execution device detects that the communication has been disconnected.

9. The web application system according to claim 1,
wherein the application execution device detects that the communication has been recovered after communication with the server has been disconnected, and
the terminal-side information management device requests the server-side information management device to perform recovery of the second information when the application execution device has detected that the communication has been recovered.

10. The web application system according to claim 1,
wherein the server-side storage device stores information definition data for defining an authentication permission level for the terminal for each variable name of the first information, and
the server-side information management device generates the first information on the basis of the information definition data stored in the server-side storage device in response to a request for acquisition of the first information from the application execution device.

11. The web application system according to claim 10, further comprising an information definition generation device that generates the information definition data.

12. The web application system according to claim 10, wherein the server-side information management device selects information definition data associated with the terminal from among the information definition data stored in the server-side storage device on the basis of a result of authentication permission of the terminal according to a predetermined communication protocol, and generates the first information on the basis of the selected information definition data.

13. The web application system according to claim 1, further comprising:
a display device that displays an image; and
a display control device that causes the display device to display the image on the basis of the second information synchronized with first information of each of a plurality of servers.

14. A server comprising:
a server-side updating device that updates first information stored in a server-side storage device on the basis of a server-side event;
a server-side detection device that detects that the first information has been updated;
a server-side synchronization device that notifies a terminal of information indicating that the first information has been updated when the server-side detection device detects that the first information has been updated; and
a program providing device that provides a program for causing the terminal to function as an application execution device in response to a request from a browser of the terminal, the application execution device including a terminal-side synchronization device that starts synchronization of second information stored in a terminal-side storage device with the first information when information indicating that the first information has been updated is received, and a process execution device that executes a process based on the second information according to an operation of a user,
wherein the first information and the second information include a variable name, a value of a variable, a revision number associated with updating of the variable, and an acknowledged revision number for determining whether or not the first information and the second information have been synchronized, which are used in the server-side event,
wherein the server further comprises,
a server-side information management device that generates the first information; and
a terminal-side information management device that generates the second information on the basis of structure information of the first information obtained from the server-side information management device.

15. A terminal comprising:
an application execution device that functions by a web application being executed, the application execution device including a terminal-side synchronization device that starts synchronization of second information stored in a terminal-side storage device with first information stored in a server-side storage device when information indicating that the first information has been updated is received on the basis of a server-side event that is executed in a service device, and a process execution device that executes a process based on the second information according to an operation of a user,
wherein the first information and the second information include a variable name, a value of a variable, a revision number associated with updating of the variable, and an acknowledged revision number for determining whether or not the first information and the second information have been synchronized, which are used in the server-side event;
wherein the terminal further comprises,
a server-side information management device that generates the first information; and
a terminal-side information management device that generates the second information on the basis of structure information of the first information obtained from the server-side information management device.

16. A non-transitory computer-readable storage medium storing a computer program of a server, the program causing a computer of the server to:
update first information stored in a server-side storage device on the basis of a server-side event;
detect that the first information has been updated;
notify a terminal of information indicating that the first information has been updated when it is detected that the first information has been updated; and
provide a program for causing the terminal to function as an application execution device in response to a request from a browser of the terminal, the application execution device including a terminal-side synchronization device that starts synchronization of second information stored in a terminal-side storage device with the first information when information indicating that the first information has been updated is received, and a process execution device that executes a process based on the second information according to an operation of a user, wherein the first information and the second information include a variable name, a value of a variable, a revision number associated with updating of the variable, and an acknowledged revision number for determining whether or not the first information and the second information have been synchronized, which are used in the server-side event;

wherein the computer program of the server m further causes the computer of the server to, generates the first information at a server-side information management device; and generate the second information at a terminal-side information management device on the basis of structure information of the first information obtained from the server-side information management device.

17. A non-transitory computer-readable storage medium storing a computer program that is downloaded to a terminal as a part of a web application, the program causing a computer of the terminal to:

start synchronization of second information stored in a terminal-side storage device with first information stored in a server-side storage device when information indicating that the first information has been updated is received on the basis of a server-side event that is executed in a service device, and execute a process based on the second information according to an operation of a user, wherein the first information and the second information include a variable name, a value of a variable, a revision number associated with updating of the variable, and an acknowledged revision number for determining whether or not the first information and the second information have been synchronized, which are used in the server-side event;

wherein the computer program further causes the computer of the terminal to, generates the first information at a server-side information management device; and generate the second information at a terminal-side information management device on the basis of structure information of the first information obtained from the server-side information management device.

* * * * *